US012602480B2

(12) United States Patent
Kumazawa et al.

(10) Patent No.: US 12,602,480 B2
(45) Date of Patent: *Apr. 14, 2026

(54) DATA MANAGEMENT APPARATUS AND DATA MANAGEMENT METHOD

(71) Applicants: TOYOTA JIDOSHA KABUSHIKI KAISHA, Aichi-ken (JP); Scalar, Inc., Tokyo (JP)

(72) Inventors: Kazuya Kumazawa, Nagoya (JP); Naoki Yamamuro, Nagoya (JP); Yohei Nakanishi, Nagoya (JP); Shigeki Matsumoto, Nagoya (JP); Takaya Uchino, Nisshin (JP); Wataru Fukatsu, Tokyo (JP)

(73) Assignees: TOYOTA JIDOSHA KABUSHIKI KAISHA, Aichi-ken (JP); SCALAR, INC., Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 18/624,121

(22) Filed: Apr. 2, 2024

(65) Prior Publication Data

US 2024/0330465 A1    Oct. 3, 2024

(30) Foreign Application Priority Data

Apr. 3, 2023    (JP) ................................. 2023-060207

(51) Int. Cl.
*G06F 21/57*        (2013.01)

(52) U.S. Cl.
CPC ........ *G06F 21/57* (2013.01); *G06F 2221/034* (2013.01)

(58) Field of Classification Search
CPC .... G06F 21/57; G06F 2221/034; G06F 21/64; G06F 21/602; G06F 21/6227
See application file for complete search history.

(56) References Cited

U.S. PATENT DOCUMENTS

2010/0023773 A1* 1/2010 Todaka ................. G06F 21/608
                                                    713/176
2021/0314155 A1* 10/2021 Novotny ................. G06F 16/27
                           (Continued)

FOREIGN PATENT DOCUMENTS

JP          6694204 B1    5/2020

OTHER PUBLICATIONS

Notice of Allowance in U.S. Appl. No. 18/622,270, mailed Aug. 4, 2025, 12pp.

*Primary Examiner* — Anh Nguyen
(74) *Attorney, Agent, or Firm* — HAUPTMAN HAM, LLP

(57)        ABSTRACT

A client server includes: a storage that stores a distributed ledger; and a processor that performs a plurality of verification processes for one or more files and one or more confirmation times. In the distributed ledger, one or more file hash values and one or more time stamp tokens are stored in time series. The plurality of verification processes include a file verification process, a confirmation time verification process, and a sequence verification process. The file verification process is a process of verifying whether or not the one or more files have been tampered with. The confirmation time verification process is a process of verifying whether or not the one or more confirmation times have been tampered with. The sequence verification process is a process of verifying a sequence of the one or more files and the one or more confirmation times.

8 Claims, 28 Drawing Sheets

(56)                          References Cited

U.S. PATENT DOCUMENTS

| | | | |
|---|---|---|---|
| 2022/0121643 A1 | 4/2022 | Yamada | |
| 2022/0123991 A1 | 4/2022 | Yamada | |
| 2023/0126583 A1* | 4/2023 | Ishida | H04L 9/50 |
| | | | 713/168 |
| 2024/0333516 A1* | 10/2024 | Yamamuro | H04L 9/3239 |

* cited by examiner

Age ↓

| 4B | CONFIRMATION TIME |
|---|---|
| 18A | ☐ SAMPLE 16.png |
| 17A | ☑ SAMPLE 15.docx |
| 16A | ☑ SAMPLE 01.pdf |
| 3B | CONFIRMATION TIME |
| 15A | ☐ SAMPLE 14.docx |
| 14A | ☐ SAMPLE 13.pptx |
| 13A | ☐ SAMPLE 12.pdf |
| 12A | ☐ SAMPLE 11.jpg |
| 11A | ☐ SAMPLE 10.txt |
| 10A | ☐ SAMPLE 09.txt |
| 9A | ☐ SAMPLE 08.pdf |
| 8A | ☐ SAMPLE 02.txt |
| 2B | CONFIRMATION TIME |
| 7A | ☐ SAMPLE 07.pptx |

IMMEDIATELY AFTER LATEST FILE

IMMEDIATELY BEFORE OLDEST FILE

924

(Age=3B)
CONFIRMATION-TIME
20YY-MM-DD HH:MM.SS
TAMPERING NOT FOUND

923

(Age=16A)
SAMPLE 01.pdf
20YY-MM-DD HH:MM.SS
TAMPERING NOT FOUND

922

(Age=17A)
SAMPLE 15.docx
20YY-MM-DD HH:MM.SS
TAMPERING NOT FOUND

921

(Age=4B)
CONFIRMATION-TIME
20YY-MM-DD HH:MM.SS
TAMPERING NOT FOUND

DISTRIBUTED LEDGER

EVIDENCE CHAIN X                                         63X

| Key | Age | Data | Nonce | Sig | Prev-RH | RH |
|---|---|---|---|---|---|---|
| kx | | FHx(N) | | | – | hx(N) |
| kx | | FHx(N+2) | | | hx(N) | hx(N+2) |
| kx | | FHx(N+3) | | | hx(N+2) | hx(N+3) |

EVIDENCE CHAIN Y                                         63Y

| Key | Age | Data | Nonce | Sig | Prev-RH | RH |
|---|---|---|---|---|---|---|
| ky | | FHy(N+1) | | | – | hy(N+1) |
| ky | | FHy(N+2) | | | hy(N+1) | hy(N+2) |

EVIDENCE CHAIN Z                                         63Z

| Key | Age | Data | Nonce | Sig | Prev-RH | RH |
|---|---|---|---|---|---|---|
| kz | | FHz(N) | | | – | hz(N) |
| kz | | FHz(N+1) | | | hz(N) | hz(N+1) |
| kz | | FHz(N+2) | | | hz(N+1) | hz(N+2) |

TIME STAMP CHAIN                                         64

| Key | Age | Data | Nonce | Sig | Prev-RH | RH | |
|---|---|---|---|---|---|---|---|
| k4 | | hx(N), hz(N) | | | – | H(N) | R41 |
| k4 | | TS(N) | | | H(N) | H(N+1) | R42 |
| k4 | | hy(N+1), hz(N+1) | | | H(N+1) | H(N+2) | R43 |
| k4 | | TS(N+1) | | | H(N+2) | H(N+3) | R44 |
| k4 | | hx(N+2), hz(N+2) | | | H(N+3) | H(N+4) | R45 |
| k4 | | TS(N+2) | | | H(N+4) | H(N+5) | R46 |
| k4 | | hx(N+3), hy(N+3) | | | H(N+5) | H(N+6) | R47 |
| k4 | | TS(N+3) | | | H(N+6) | H(N+7) | R48 |

DATA MANAGEMENT APPARATUS AND DATA MANAGEMENT METHOD

CROSS REFERENCE TO RELATED APPLICATIONS

This nonprovisional application is based on Japanese Patent Application No. 2023-060207 filed on Apr. 3, 2023 with the Japan Patent Office, the entire contents of which are hereby incorporated by reference.

BACKGROUND

Field

The present disclosure relates to a data management apparatus and a data management method, and more particularly, to a data management apparatus and a data management method to each of which distributed ledger technology (DLT) is applied.

Description of the Background Art

Japanese Patent No. 6694204 discloses a data management system to which the distributed ledger technology is applied.

SUMMARY

A data management apparatus or a data management method has been proposed to manage files and confirmation times by using the distributed ledger technology. For example, when a plurality of users jointly manage files and confirmation times by using such a system or method, there exists a demand for appropriately verifying whether or not the files and the confirmation times are appropriately managed in order to prevent or resolve a trouble between the users.

The present disclosure has been made to solve the above-described problem and one of objects of the present disclosure is to verify whether or not a file and a confirmation time are appropriately managed in a data management apparatus or a data management method to each of which the distributed ledger technology is applied.

(1) A data management apparatus according to a first aspect of the present disclosure includes: a storage that stores a distributed ledger; and a processor that performs a plurality of verification processes for one or more files and one or more confirmation times. In the distributed ledger, one or more hash values respectively generated from the one or more files and one or more time stamp tokens proving the one or more confirmation times are stored in time series. The plurality of verification processes include first to third verification processes. The first verification process is a process of verifying whether or not the one or more files used to generate the one or more hash values have been tampered with. The second verification process is a process of verifying whether or not the one or more confirmation times proven by the one or more time stamp tokens have been tampered with. The third verification process is a process of verifying a sequence of the one or more files and the one or more confirmation times.

In the configuration of (1), integrity of each file (whether or not the file has been tampered with) can be verified by the first verification process. Integrity of each confirmation time (whether or not the confirmation time has been tampered with) can be verified by the second verification process. The sequence of the files and the confirmation times in the distributed ledger can be verified by the third verification process. Therefore, according to the configuration of (1), it is possible to verify whether or not the files and the confirmation times are appropriately managed.

(2) The processor performs at least one of the first to third verification processes in accordance with an operation performed by a user on an input device.

In the configuration of (2), at least one of the first to third verification processes is performed in accordance with the operation performed by the user. Therefore, according to the configuration of (2), verification requested by the user can be performed at a timing desired by the user.

(3) When a first user operation is performed on the input device, the processor performs the first to third verification processes on a part, selected by the user, of the one or more files and the one or more confirmation times.

In the configuration of (3), when the first user operation is performed, the target to be verified is limited to the part, selected by the user, of the files and/or the confirmation times. Thus, verification cost (the number of processes, time, system load, etc.) is reduced as compared with a case where all the files and all the confirmation times are each a target to be verified. Therefore, according to the configuration of (3), it is possible to efficiently verify whether or not the files and the confirmation times are appropriately managed.

(4) When two or more files are selected by the user, the processor at least verifies an oldest file of the two or more files, a confirmation time immediately before the oldest file, a latest file of the two or more files, and a confirmation time immediately after the latest file.

In the configuration of (4), the confirmation time immediately before the oldest file and the confirmation time immediately after the latest file each are a target to be verified. Thus, it is possible to prove which file of the two or more files selected by the user existed and which file of the two or more files selected by the user did not exist at the confirmation time immediately before the oldest file and the confirmation time immediately after the latest file. In other words, it is possible to prove that the two or more files selected by the user are stored in the distributed ledger between the confirmation time immediately before the oldest file and the confirmation time immediately after the latest file. Therefore, according to the configuration of (4), the sequence of the files and the confirmation times can be effectively verified by a simple user operation.

(5) When there is another confirmation time between the two or more files, the processor further verifies the other confirmation time.

In the configuration of (5), the other confirmation time between the two or more files is also verified. This makes it possible to prove which file existed and which file did not exist at the other confirmation time. Therefore, according to the configuration of (5), the sequence of the files and the confirmation times can be verified more in detail.

(6) When a second user operation is performed on the input device, the processor performs the first to third verification processes to all of the one or more files and the one or more confirmation times.

In the configuration of (6), when the second user operation is performed, the integrity of each of all the files and the integrity of each of all the confirmation times are verified. Therefore, according to the configuration of (6), the integrity of each of the files and the integrity of each of the confirmation times can be thoroughly verified.

(7) When a third user operation is performed on the input device, the processor performs the third verification process and does not perform the first verification process and the second verification process.

In the configuration of (7), when the third user operation is performed, the sequence of the files and the confirmation times is selectively verified. Therefore, according to the configuration of (7), when the integrity of each of the files and the integrity of each of the confirmation times are not requested to be verified, the sequence of the files and the confirmation times can be efficiently verified.

(8) When the processor controls an output device to display verification results for three or more files or confirmation times, the processor controls the output device to display a verification result for an oldest file or confirmation time and a verification result for a latest file or confirmation time, and controls the output device not to display a verification result for at least one file or confirmation time between the oldest file or confirmation time and the latest file or confirmation time until an operation performed by a user on an input device is received.

According to the configuration of (8), the at least one file or confirmation time between the oldest file or confirmation time and the latest file or confirmation time is not displayed to attain simplified display, with the result that the user can readily check outlines of the verification results.

(9) When the processor controls the output device to display verification results for two or more files or confirmation times, the processor controls the output device to display the verification results for the confirmation times in a more emphasized manner than the verification results for the files.

According to the configuration of (9), the user can readily distinguish the verification results for the confirmation times from the verification results for the files and can readily check them.

(10) A data management method according to a second aspect of the present disclosure includes first and second steps. The first step is storing, in a distributed ledger by a processor in time series, one or more hash values respectively generated from one or more files and one or more time stamp tokens proving one or more confirmation times. The second step is performing, by the processor, a plurality of verification processes for the one or more files and the one or more confirmation times. The plurality of verification processes include first to third verification processes. The first verification process is a process of verifying whether or not the one or more files used to generate the one or more hash values have been tampered with. The second verification process is a process of verifying whether or not the one or more confirmation times proved by the one or more time stamp tokens have been tampered with. The third verification process is a process of verifying a sequence of the one or more files and the one or more confirmation times.

According to the method of (10), it is possible to verify whether or not the files and the confirmation times are appropriately managed, as with the configuration of (1).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 17 is a diagram showing exemplary display in a file selection box.

FIG. 25 is a diagram showing an exemplary data structure of a distributed ledger according to a second embodiment.

DESCRIPTION OF THE PREFERRED EMBODIMENTS

Figure 1:
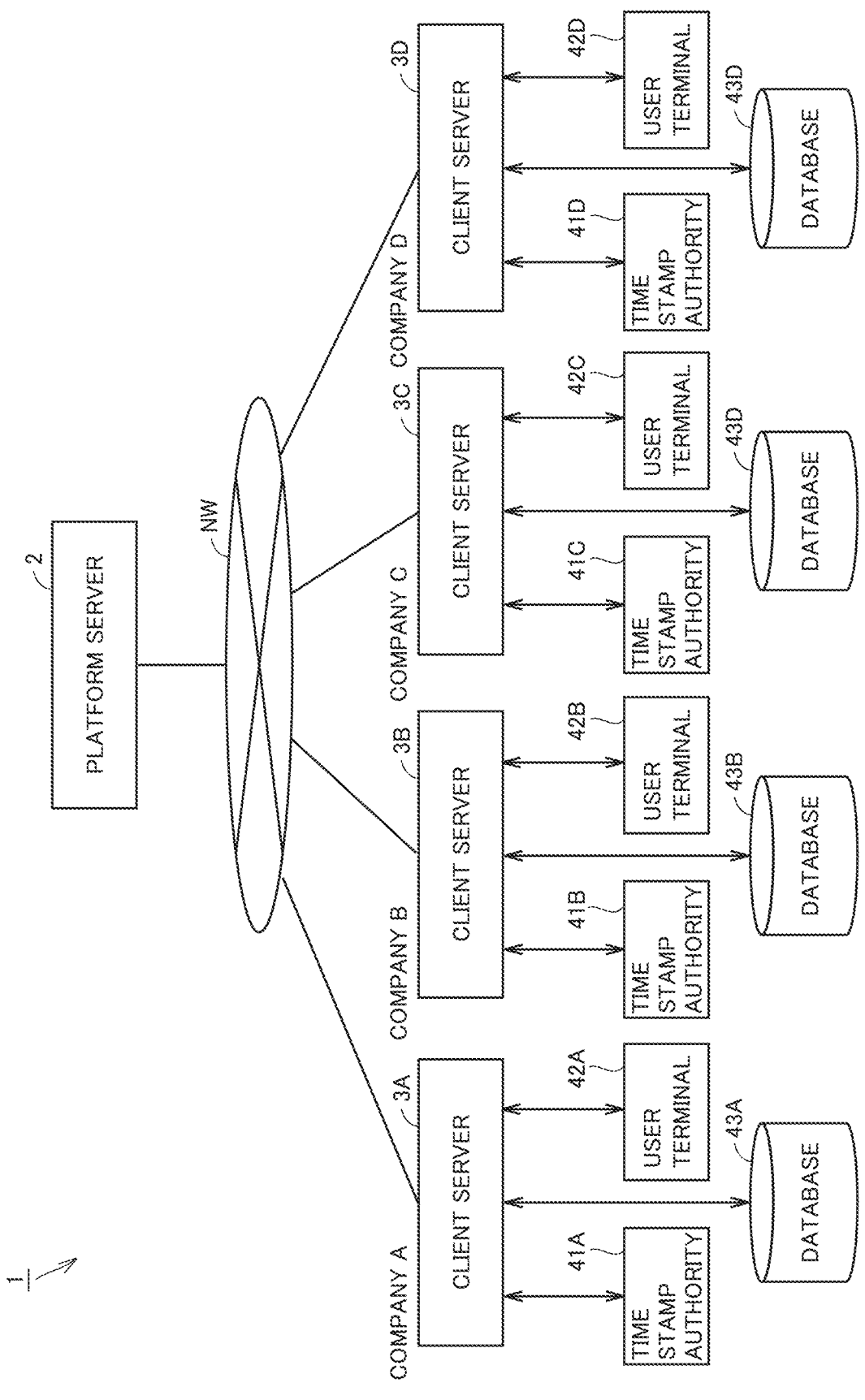
FIG. 1 is a diagram showing an exemplary overall configuration of a data management system according to a first embodiment of the present disclosure.

Hereinafter, embodiments of the present disclosure will be described in detail with reference to figures. In the figures, the same or corresponding portions are denoted by the same reference characters and will not be described repeatedly.

First Embodiment

<System Configuration>

FIG. 1 is a diagram showing an exemplary overall configuration of a data management system according to a first embodiment of the present disclosure. Data management system 1 is a system that manages data by using the distributed ledger technology. The data managed by data management system 1 are files and confirmation times. The type and data format of each file are not particularly limited. The file may be design data of a vehicle (or a component of the vehicle), a control program for the vehicle, or a document file in which specification of the vehicle or know-how for development are described. Each of the confirmation times is a time (typically, a time including year, month, day, hour, minute, and second) proven by a time stamp token acquired from a time stamp authority (TSA). The confirmation time may be referred to as a confirmation date.

Data management system 1 includes, for example, a platform server 2 and a plurality of client servers 3A to 3D. In this example, it will be illustratively described that four client servers are included in data management system 1. However, the number of client servers may be two or more.

Platform server 2 manages a network NW. Network NW is, for example, a consortium network formed among a plurality of companies. Platform server 2 receives, from a client server, a request for participation in network NW. Platform server 2 permits the client server to participate in network NW, based on an operation by an administrator of platform server 2 or based on a result of determination under a predetermined condition.

Four client servers 3A to 3D are servers belonging to companies A to D, respectively. In each of client servers 3A to 3D, distributed-ledger-based software is introduced. The distributed-ledger-based software functions to function each of client servers 3A to 3D as a node. Hereinafter, client server 3A belonging to company A will be representatively described; however, each of client servers 3B to 3D belonging to the other companies B to D has the same configuration and function. It should be noted that each of client servers 3A to 3D corresponds to a "data management apparatus" according to the present disclosure.

Client server 3A is connected to a TSA 41A, a user terminal 42A, and a database 43A so as to communicate with each of them.

TSA 41A issues a time stamp token in response to a time stamp issuing request from client server 3A, which is a requester. The time stamp token is obtained by combining a file (below-described record hash value in the first embodiment) received from the requester with time information that is based on a time source having traceability in the international standard time. TSA 41A is preferably a public certification authority that can issue an official certificate. The same TSA may be employed among part or all of client servers 3A to 3D.

User terminal 42A is an information processing terminal lent to a user (for example, an employee of company A), such as a PC (personal computer), a smartphone, or a tablet.

User terminal 42A functions as an input device 34 and/or an output device 35 (see FIG. 2) of client server 3A.

Database 43A is a rewritable storage, such as an HDD (Hard Disk Drive), an SSD (Solid State Drive), or a flash memory. When the user performs an operation on input device 34 (see FIG. 2) of client server 3A or user terminal 42A to request registration and/or updating of a file or confirmation time, client server 3A outputs a control signal to database 43A in response to the operation. Database 43A stores (registers and/or updates) the file or confirmation time in accordance with the control signal from client server 3A. The same database may be employed among part or all of client servers 3A to 3D.

Figure 2:
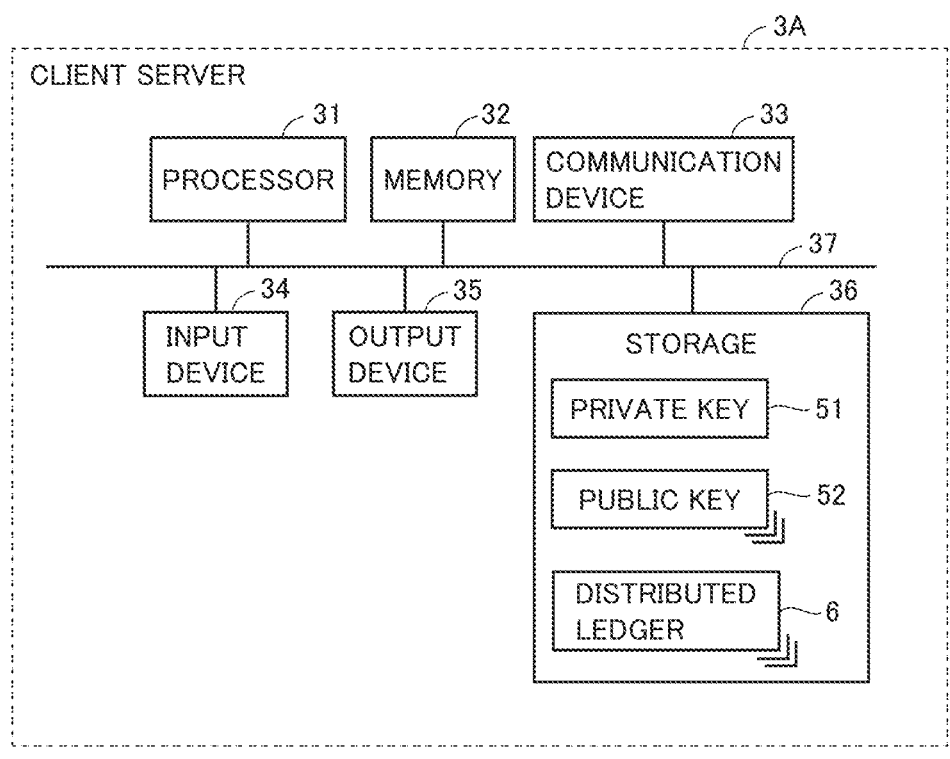
FIG. 2 is a diagram showing an exemplary configuration of a client server.

FIG. 2 is a diagram showing an exemplary configuration of client server 3A. Referring to FIGS. 1 and 2, client server 3A includes a processor 31, a memory 32, a communication device 33, input device 34, output device 35, and a storage 36. The components of client server 3A are connected together by a bus 37 so as to communicate with one another.

Processor 31 is a calculation processing unit such as a CPU (Central Processing Unit) or an MPU (Micro-Processing Unit). Memory 32 includes a ROM (Read Only Memory) and a RAM (Random Access Memory). Memory 32 includes: a system program including an OS (Operating System); and a control program including a computer-readable code necessary for a control calculation. Processor 31 reads out a system program and a control program, loads them onto memory 32, and executes them, thereby implementing various processes. As described later in detail, processor 31 stores a file or confirmation time into database 43, acquires a time stamp token from TSA 41A, and generates transaction data for updating the distributed ledger.

It should be noted that FIG. 2 shows an example in which client server 3A includes only one processor; however, client server 3A may include a plurality of processors. That is, client server 3A includes one or more processors. The same applies to memory 32 and storage 36. In the present specification, the "processor" is not limited to a processor in a narrow sense, i.e., a processor that performs a process in a stored-program manner, and can include a hard-wired circuitry such as an ASIC (Application Specific Integrated Circuit) or an FPGA (Field-Programmable Gate Array). Thus, the term "processor" may be interpreted as a processing circuitry in which a process is defined in advance by a computer-readable code and/or a hard-wired circuitry.

Communication device 33 communicates with devices external to client server 3A. The devices external thereto include platform server 2, the other client servers 3B to 3D, TSA 41A, user terminal 42A, database 43A, and the like.

Input device 34 is a device that can receive an operation by a user, such as a mouse, a keyboard, or a touch panel. Output device 35 is a device that can provide information to the user, and is typically a display.

Storage 36 is a rewritable storage, such as an HDD, SSD, or flash memory. Storage 36 stores a private key 51, a plurality of public keys 52, and distributed ledger 6.

Private key 51 is a private key managed by company A. The plurality of public keys 52 include public keys of companies B to D. The plurality of public keys 52 may include a public key of company A itself. For example, when client server 3A first participates in network NW, processor 31 generates a private key and a public key. Then, processor 31 transmits the generated public key to a certification authority (not shown) to receive a certification. The certification authority issues an electronic certificate including information of the public key. Processor 31 stores, into storage 36, private key 51 corresponding to the certified public key. Further, processor 31 transmits the certified public key (electronic certificate) 62 to client servers 3B to 3D of other companies B to D. Similarly, each of client servers 3B to 3D transmits its public key to each of the other client servers.

Distributed ledger 6 includes a plurality of ledgers. Since each of the ledgers has a chain structure (more specifically, directed acyclic graph (DAG) structure), the ledger will be hereinafter also referred to as "chain". In the first embodiment, two types of chains described below are prepared for each predetermined target (for example, each vehicle, each component, each control program, and each specification). When client server 3 stores a file and/or a confirmation time into database 43, client server 3 stores information for the file and/or the confirmation time into the two chains.

Hereinafter, when client servers 3A to 3D are not particularly distinguished from one another, A to D are not given to the reference character and will be referred to as "client servers 3". The same applies to the time stamp authorities, the user terminals, and the databases.

<Distributed Ledger Technology>

Figure 3:
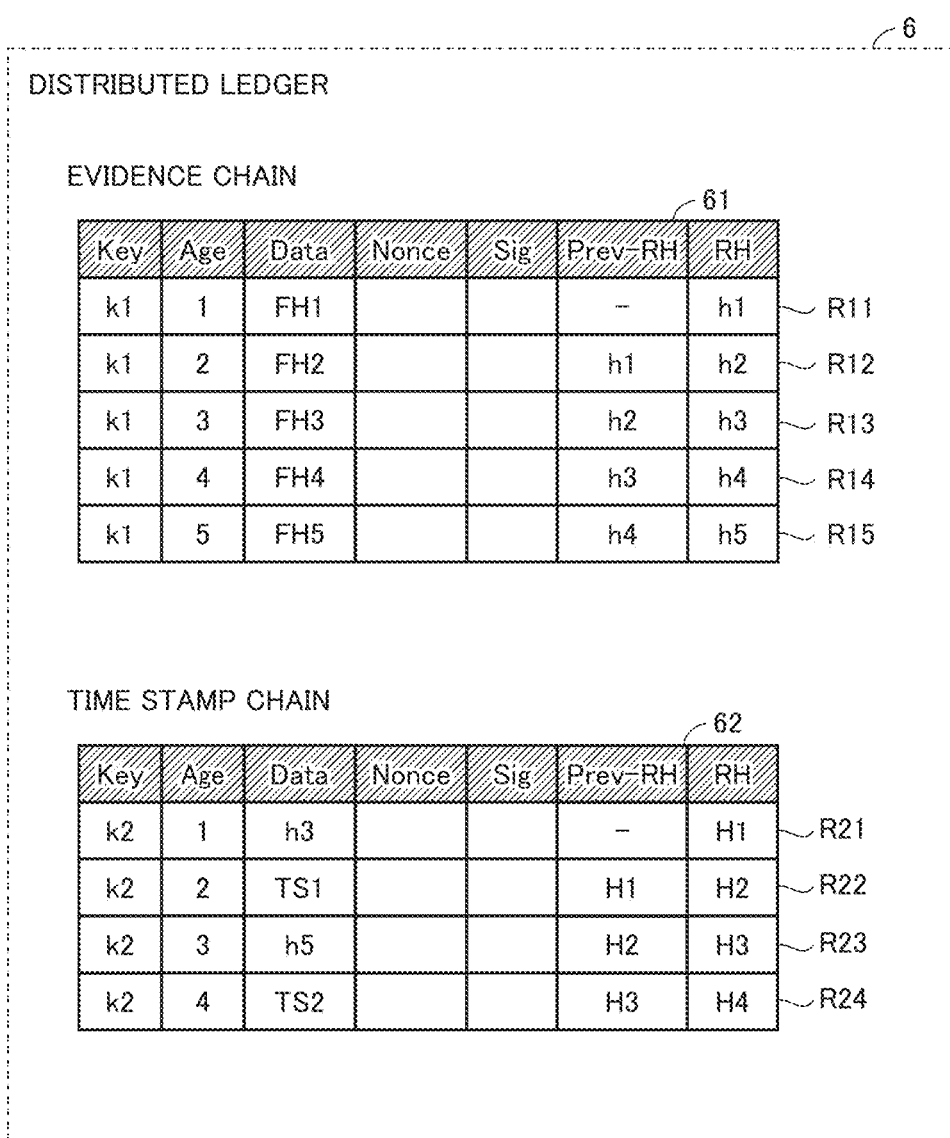
FIG. 3 is a diagram showing an exemplary data structure of a distributed ledger.

FIG. 3 is a diagram showing an exemplary data structure of distributed ledger 6. Distributed ledger 6 includes, for example, a plurality of evidence chains 61 and a plurality of time stamp chains 62. For convenience of illustration, one chain is shown for each of the two types of chains in FIG. 3. In the first embodiment, one evidence chain 61 and one time stamp chain 62 are associated with each other. However, as described later in the second embodiment, a plurality of evidence chains 61 may be associated with one time stamp chain 62.

Each of evidence chains 61 is a ledger in which records for files are stored in time series. In the example shown in FIG. 3, evidence chain 61 includes five records R11 to R15. Each record includes a key (Key), an age (Age), data (Data), a nonce value (Nonce), an electronic signature (Sig), a previous-record hash value (Prev-RH), and a record hash value (RH).

The key is identification information (ID) for identifying evidence chain 61. The identification information of the target (a vehicle, a component, a control program, a specification, or the like) may be used as a key. In this example, Key=k1 is assigned to evidence chain 61. Thus, the record Key=k1 is stored in evidence chain 61.

The age (also referred to as generation) is information indicating the order of records. The age of the first record is 1. Whenever a file and/or a confirmation time are updated to add a record, the age is incremented. Hereinafter, the first (oldest) record is also referred to as "start record". The last (latest) record is also referred to as "end record".

The data in evidence chain 61 is a hash value (hereinafter also referred to as "file hash value") generated from a file. When the file is updated, the updated file is hashed using a hash function, thereby generating a hash value. The generated hash value is stored as the file hash value. In this example, file hash values FH1 to FH5 are stored in five records R11 to R15, respectively. It should be noted that each of the file hash values corresponds to a "hash value" according to the present disclosure.

The nonce value is a value indicating a number for transaction data. The nonce value is used, for example, as a number for a process of storing a file hash value in evidence chain 61 when a file is updated.

The electronic signature is information for checking the identity of client server 3 having issued the transaction data. The electronic signature is created, for example, by encrypting the file hash value using private key 51 of client server 3 having issued the transaction data.

The previous-record hash value is a record hash value of a record (in other words, a parent record) one age before the record.

The record hash value is a hash value of the record. The record hash value is generated by hashing, using a hash function, the other information (Key, Age, Data, Nonce, Sig, Prev-RH, and the like) of the record than the record hash value.

The record hash value of end record (record with Age=5) R15 of evidence chain 61 is "h5". The previous-record hash value of end record R15 is "h4", which is the record hash value of parent record (record with Age=4) R14. The previous-record hash value of record R14 is "h3", which is the record hash value of parent record (record with Age=3) R13. In this way, in evidence chain 61, each of the plurality of records includes the record hash value (previous-record hash value) of the parent record of the record and are therefore chained.

Each of time stamp chains 62 is a ledger in which records for the confirmation times are stored in time series. In the example shown in FIG. 3, time stamp chain 62 includes four records R21 to R24. As with the records of the evidence chain, each record includes a key, an age, data, a nonce value, an electronic signature, a previous-record hash value, and a record hash value.

The data in evidence chain 61 is a file hash value, whereas the data in time stamp chain 62 is a time stamp token or an end hash value (End-RH). Although details will be described later, in response to a user operation for requesting acquisition of the time stamp token, the time stamp token for the end hash value of evidence chain 61 is acquired from TSA 41. In this example, time stamp tokens TS1, TS2 are stored in two records R22, R24, respectively.

The end hash value is the record hash value of the end record of evidence chain 61 at the time at which the user operation for requesting the acquisition of the time stamp token is performed. In this example, the record hash value "h3" of record R13 of evidence chain 61 is stored as the end hash value in record R21. In record R23, the record hash value "h5" of record R15 of evidence chain 61 is stored as the end hash value.

The information included in time stamp chain 62 and other than the information described above is the same as the corresponding information of evidence chain 61, and therefore will not be described repeatedly in detail.

Figure 4:
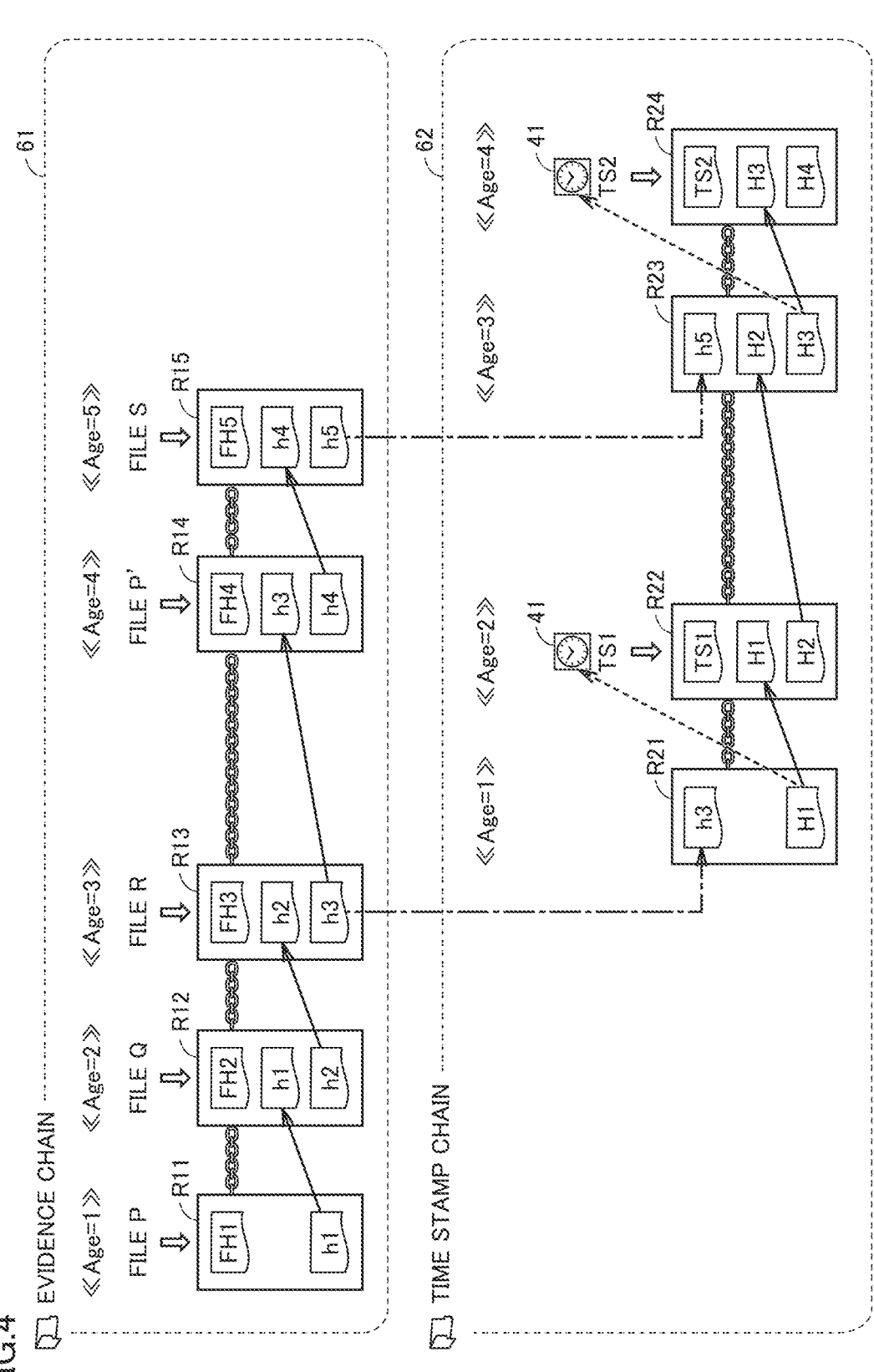
FIG. 4 is a conceptual diagram for illustrating a relation between records in an evidence chain and a time stamp chain.

FIG. 4 is a conceptual diagram for illustrating a relation between records stored in evidence chain 61 and time stamp chain 62. Hereinafter, the explanation will be made in a time-series manner with reference to both FIGS. 3 and 4.

<<Evidence Chain With Age=1>>

First, a file P is registered in database 43 in accordance with a user operation. Client server 3A generates transaction data for adding record R11 as the first age (Age=1) to evidence chain 61. Record R11 includes: file hash value FH1 generated by hashing file P; and a record hash value h1.

Client server 3A transmits the generated transaction data to network NW. By performing a process (transaction process) for the transaction data in each of client servers 3A to 3D, record R11 is added to evidence chain 61 of each of client servers 3A to 3D. These processes are the same for subsequent ages, and therefore will not be described repeatedly.

<<Evidence Chain Eith Age=2>>

When a file Q is registered in database 43 in accordance with a user operation, client server 3A generates transaction data for adding record R12 as the second age (Age=2) to evidence chain 61. Record R12 includes file hash value FH2 for file Q, previous-record hash value h1, and a record hash value h2.

<<Evidence Chain With Age=3>>

When a file R is registered in database 43 in accordance with a user operation, client server 3A generates transaction data for adding record R13 as the third age (Age=3) to evidence chain 61. Record R13 includes file hash value FH3 for file R, previous-record hash value h2, and a record hash value h3.

<<Time Stamp Chain With Age=1>>

When record R13 is an end record of evidence chain 61, it is assumed that the user has performed, onto input device 34 (or user terminal 42A), an operation for providing a confirmation time to record R13. In response to the user operation, client server 3A generates transaction data for adding record R21 as the first age (Age=1) to time stamp chain 62. Record R21 includes end hash value (record hash value of record R13, which is the end record of evidence chain 61) h3 and a record hash value H1.

<<Time Stamp Chain With Age=2>>

Client server 3A acquires time stamp token TS1 for record hash value (previous-record hash value) H1 of parent record R21 from TSA 41A. Client server 3A generates transaction data for adding record R22 as the second age (Age=2) to time stamp chain 62. Record R22 includes time stamp token TS1, previous-record hash value H1, and a record hash value H2.

<<Evidence Chain With Age=4>>

When file P is updated to a file P' in accordance with a user operation, client server 3A generates transaction data for adding record R14 as the fourth age (Age=4) to evidence chain 61. Record R14 includes file hash value FH4 for updated file P', previous-record hash value h3, and a record hash value h4.

<<Evidence Chain With Age=5>>

When a file S is registered in database 43 in accordance with a user operation, client server 3A generates transaction data for adding record R15 as the fifth age (Age=5) to evidence chain 61. Record R15 includes file hash value FH5 for file S, previous-record hash value h4, and a record hash value h5.

<<Time Stamp Chain With Age=3>>

When record R15 is an end record of evidence chain 61, it is assumed that the user has performed, onto input device 34, an operation for providing a confirmation time to record R15. In response to the user operation, client server 3A generates transaction data for adding record R23 as the third age (Age=3) to time stamp chain 62. Record R23 includes end hash value (record hash value of record R15, which is an end record of evidence chain 61) h5, previous-record hash value H2, and a record hash value H3.

<<Time Stamp Chain With Age=4>>

Client server 3A acquires time stamp token TS2 for previous-record hash value H3 from TSA 41A. Client server 3A generates transaction data for adding record R24 as the fourth age (Age=4) to time stamp chain 62. Record R24 includes time stamp token TS2, previous-record hash value H3, and a record hash value H4.

In the present embodiment, in each of evidence chain 61 and time stamp chain 62, each of the plurality of records (except for the start record) includes the previous-record hash value, with the result that all the records are chained. Therefore, in order to tamper with any record (in particular, the file hash value or time stamp token in the record), all the records added after the foregoing record have to be tampered with. However, such tampering is realistically difficult. Therefore, according to the present embodiment, it is possible to prove that the file is not tampered with (the integrity of the file), and it is possible to prove that the confirmation time is not tampered with (the integrity of the confirmation time). It should be noted that the term "tampering" in the present specification includes "breakage" or "deletion" of each of a file and a confirmation time (time stamp token).

Since all the records are chained in evidence chain 61, the sequence of all the records stored in evidence chain 61 is uniquely specified. Therefore, according to the present embodiment, a temporal arrangement of the plurality of files (sequence of the files) can be proven.

Moreover, in the present embodiment, the time stamp token is acquired for the record hash value of the record of time stamp chain 62 including the end hash value of evidence chain 61. Thus, it is possible to prove which file exists and which file did not exist at the confirmation time proven by the time stamp token. In the example shown in FIGS. 3 and 4, time stamp token TS1 is acquired for record hash value H1 of record R21 including end hash value h3 of record R13, with the result that it is possible to prove that file R (and preceding files P, Q) has existed at the confirmation time proven by time stamp token TS1 and it is possible to prove that subsequent files P', S have not existed at the confirmation time proven by time stamp token TS1 (in other words, files P', S are registered or updated after the time proven by time stamp token TS1). Further, by acquiring time stamp token TS2 for record hash value H3 of record R23 including end hash value h5 of record R15, it is possible to prove that file S (and preceding files P, Q, R, P') has existed at the confirmation time proven by time stamp token TS2.

<Functional Block>

Figure 5:
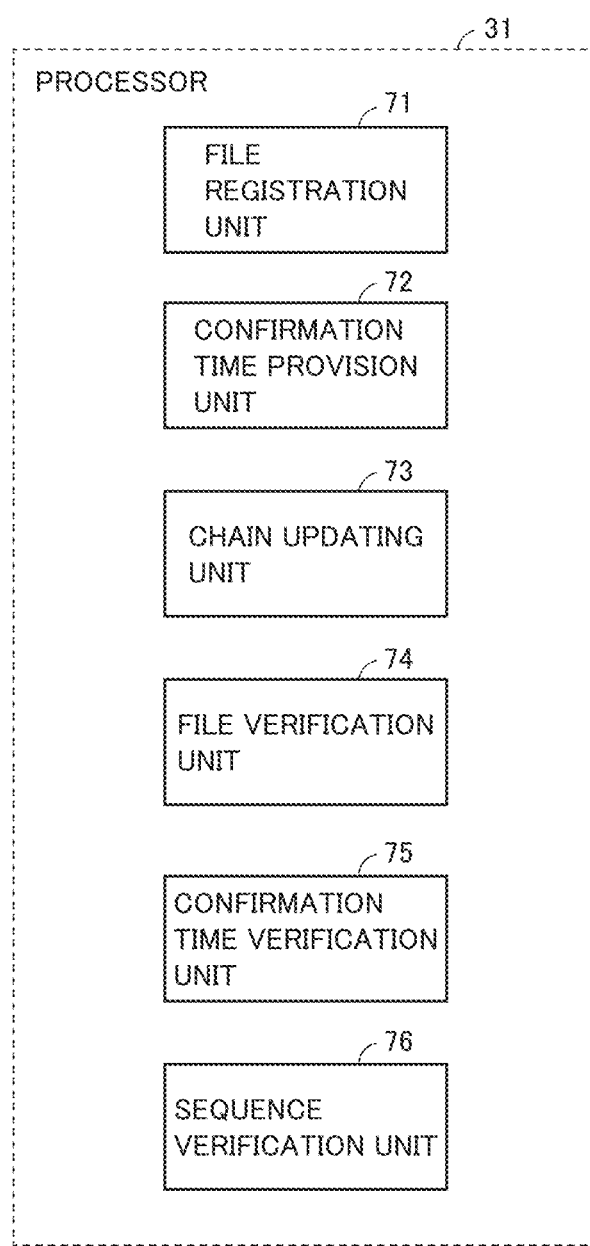
FIG. 5 is a functional block diagram for a main function of a processor of the client server.

FIG. 5 is a functional block diagram for a main function of processor 31 of client server 3. Processor 31 includes a file registration unit 71, a confirmation time provision unit 72, a chain updating unit 73, a file verification unit 74, a confirmation time verification unit 75, and an sequence verification unit 76. Each of the functional blocks is implemented by processor 31 executing a program stored in memory 32. Each of the functional blocks may be implemented by dedicated hardware (electronic circuitry). Hereinafter, these functional blocks will be sequentially described.

<<Registration of File>>

Figure 6:
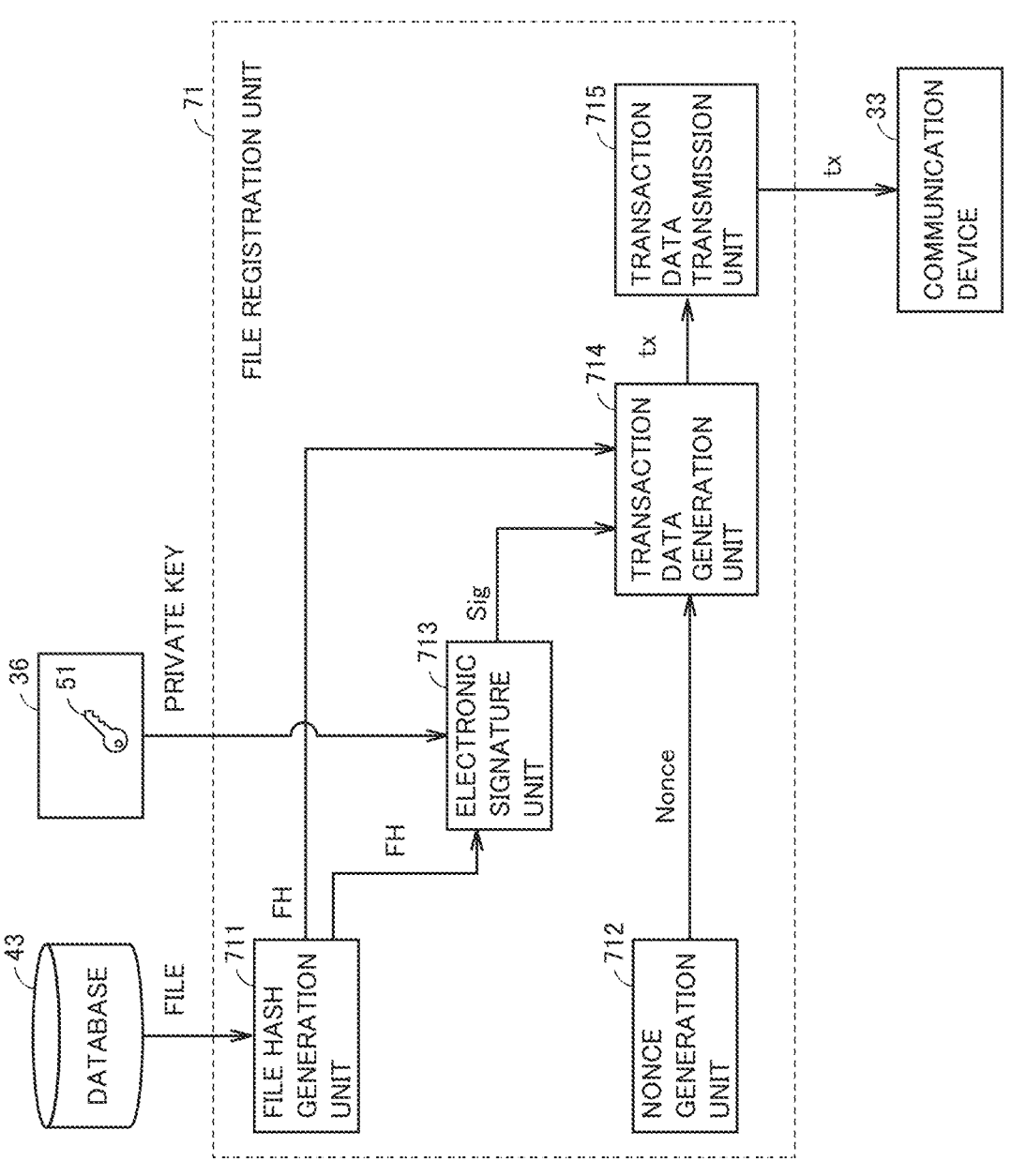
FIG. 6 is a functional block diagram of a file registration unit.

FIG. 6 is a functional block diagram of file registration unit 71. File registration unit 71 generates transaction data for adding a record including a file hash value to evidence chain 61 in accordance with a user operation for registering (or updating) a file in database 43. File registration unit 71 includes a file hash generation unit 711, a nonce generation unit 712, an electronic signature unit 713, a transaction data generation unit 714, and a transaction data transmission unit 715.

It should be noted that a request is generated in response to a user operation on input device 34 or user terminal 42. This request includes a key that is an ID for specifying an evidence chain 61 to which a record is to be added. Although not shown, each of the functional blocks receives the key from a preceding block and outputs the key to a subsequent block. Thus, the process is performed onto evidence chain 61 specified by the key.

When the request is received, file hash generation unit 711 reads a file from database 43. File hash generation unit 711 generates a file hash value (FH) by hashing the file using a hash function. File hash generation unit 711 outputs the file hash value to electronic signature unit 713 and transaction data generation unit 714.

When the request is received, nonce generation unit 712 generates a nonce value (Nonce). Nonce generation unit 712 outputs the nonce value to transaction data generation unit 714. Although not shown, when the nonce value is used to create an electronic signature, nonce generation unit 712 may output the nonce value to electronic signature unit 713.

Electronic signature unit 713 reads out a private key 51 from storage 36. Electronic signature unit 713 generates an electronic signature (Sig) by using private key 51 to encrypt the file hash value from file hash generation unit 711. Electronic signature unit 713 may create an electronic signature by using private key 51 to encrypt the nonce value from nonce generation unit 712. Electronic signature unit 713 may create an electronic signature by using private key 51 to encrypt the file hash value and the nonce value. Electronic signature unit 713 outputs the electronic signature to transaction data generation unit 714.

Transaction data generation unit 714 calculates the age of a record to be newly added to evidence chain 61. In this example, transaction data generation unit 714 acquires the age of the end record (i.e., parent record) of evidence chain 61 by inquiring the key to evidence chain 61. Alternatively, transaction data generation unit 714 acquires the age of the end record of time stamp chain 62 associated with evidence chain 61. Then, transaction data generation unit 714 increments the age of the acquired end record by 1, thereby calculating the age of the record to be newly added.

Transaction data generation unit 714 acquires, as a previous-record hash value (Prev-RH), the record hash value of the parent record of evidence chain 61 (not shown). Transaction data generation unit 714 calculates a record hash value (RH) by hashing the key, the age, the file hash value, the nonce value, the electronic signature, and the previous-record hash value. Then, transaction data generation unit 714 generates transaction data (tx) including the key, the age, the file hash value, the nonce value, the electronic signature, the previous-record hash value, and the record hash value. The transaction data desirably further includes transmitter information for specifying client server 3 that has transmitted the transaction data. Transaction data generation unit 714 may include, in the transaction data, time information for broadcasting the transaction data to network NW. Transaction data generation unit 714 outputs the transaction data to transaction data transmission unit 715.

Transaction data transmission unit 715 outputs, to communication device 33, a control signal for transmitting the transaction data. Thus, the transaction data is broadcasted to network NW via communication device 33.

<<Acquisition of Confirmation Time>>

Figure 7:
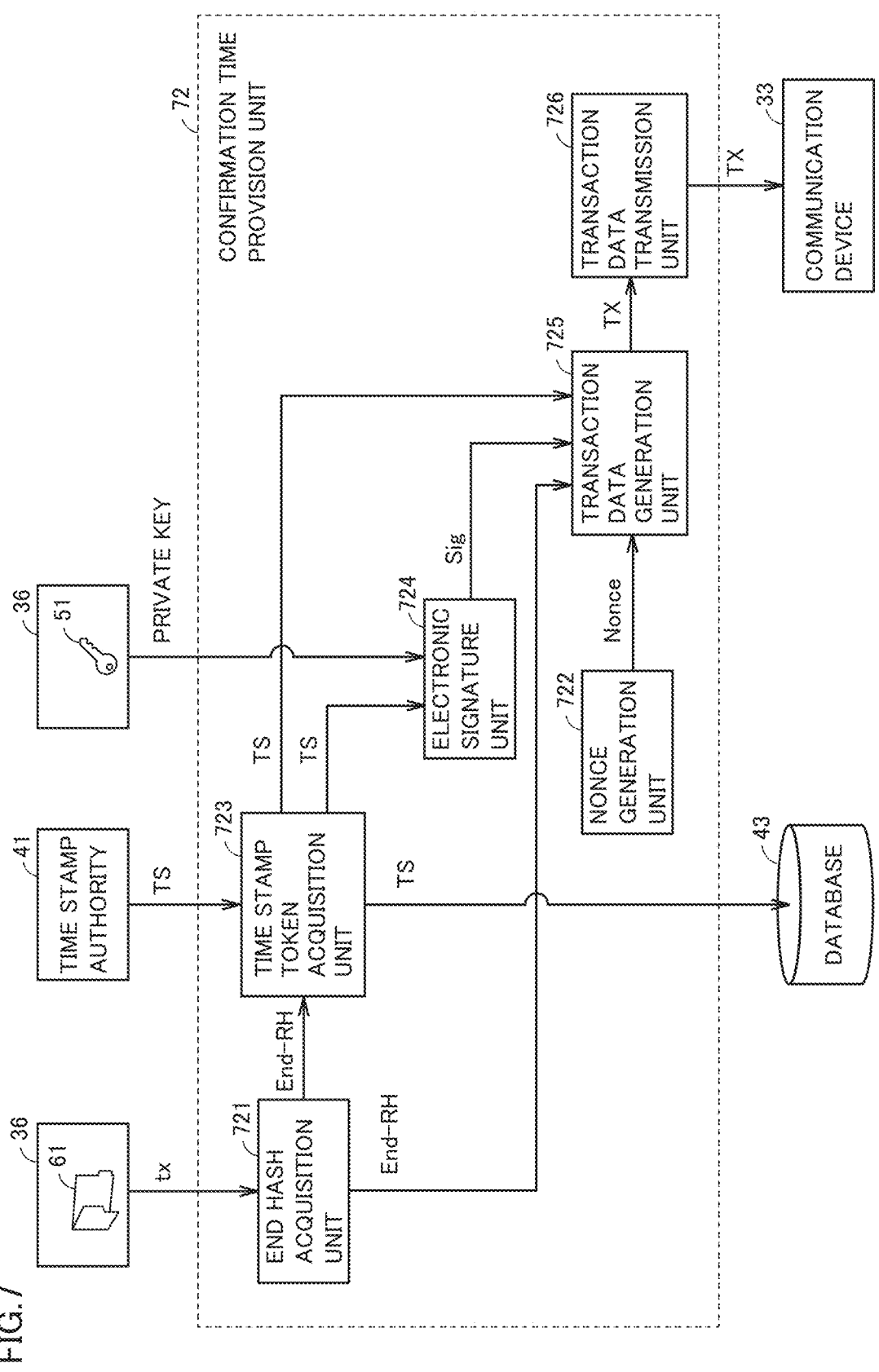
FIG. 7 is a functional block diagram of a confirmation time provision unit.

FIG. 7 is a functional block diagram of confirmation time provision unit 72. Confirmation time provision unit 72 stores a confirmation time in database 43 in accordance with a user operation. Further, confirmation time provision unit 72 generates, in accordance with the user operation, transaction data for adding a record including a time stamp token to time stamp chain 62. Confirmation time provision unit 72 includes an end hash acquisition unit 721, a nonce generation unit 722, a time stamp token acquisition unit 723, an electronic signature unit 724, a transaction data generation unit 725, and a transaction data transmission unit 726.

It should be noted that a request is generated in response to a user operation on input device 34 or user terminal 42. This request includes: a first key that is an ID for specifying an evidence chain 61 to which the confirmation time is to be provided; and a second key that is an ID for specifying a time stamp chain 62 to which the record is to be added. The functional blocks perform processes onto evidence chain 61 specified by the first key and onto time stamp chain 62 specified by the second key.

When the request is received, end hash acquisition unit 721 extracts transaction data corresponding to the end record of evidence chain 61. End hash acquisition unit 721 acquires the end hash value (record hash value of the end record) (End-RH) of evidence chain 61 from the extracted transaction data. End hash acquisition unit 721 outputs the end hash value to time stamp token acquisition unit 723 and transaction data generation unit 725.

When the request is received, nonce generation unit 722 generates a nonce value (Nonce). Nonce generation unit 722 outputs the nonce value to transaction data generation unit 725. Although not shown, when the nonce value is used to create an electronic signature, nonce generation unit 722 may output the nonce value to electronic signature unit 724.

Time stamp token acquisition unit 723 acquires a time stamp token (TS) for the end hash value from end hash acquisition unit 721. More specifically, time stamp token acquisition unit 723 transmits the end hash value to TSA 41 via communication device 33. TSA 41 returns the time stamp token to client server 3 that has transmitted the end hash value. Thus, the time stamp token is acquired. Time stamp token acquisition unit 723 stores the time stamp token in database 43 (or storage 36) as a confirmation time. Moreover, time stamp token acquisition unit 723 outputs the time stamp token to electronic signature unit 724 and transaction data generation unit 725.

Electronic signature unit 724 reads out private key 51 from storage 36. Electronic signature unit 724 generates an electronic signature (Sig) by using private key 51 to encrypt the time stamp token from time stamp token acquisition unit 723. Electronic signature unit 724 may create an electronic signature by using private key 51 to encrypt the nonce value from nonce generation unit 722. Electronic signature unit 724 may create an electronic signature by using private key 51 to encrypt the time stamp token and the nonce value. Electronic signature unit 724 outputs the electronic signature to transaction data generation unit 725.

Transaction data generation unit 725 calculates the age of a record to be newly added to time stamp chain 62. This calculation method is the same as the calculation method by transaction data generation unit 714 (see FIG. 6), and therefore will not be described repeatedly.

Transaction data generation unit 725 acquires, as a previous-record hash value (Prev-RH), the record hash value of the parent record of time stamp chain 62 (not shown). Transaction data generation unit 725 calculates a record hash value (RH) by hashing the key, the age, the data (end hash value or time stamp token), the nonce value, the electronic signature, and the previous-record hash value. Then, transaction data generation unit 725 generates transaction data (TX) including the key, the age, the time stamp token, the nonce value, the electronic signature, the end hash value, the previous-record hash value, and the record hash value. The transaction data desirably further includes transmitter information. Transaction data generation unit 725 outputs the transaction data to transaction data transmission unit 726.

Transaction data transmission unit 726 outputs, to communication device 33, a control signal for transmitting the transaction data. Thus, the transaction data is broadcasted to network NW via communication device 33.

<<Updating of Chain>>

Figure 8:
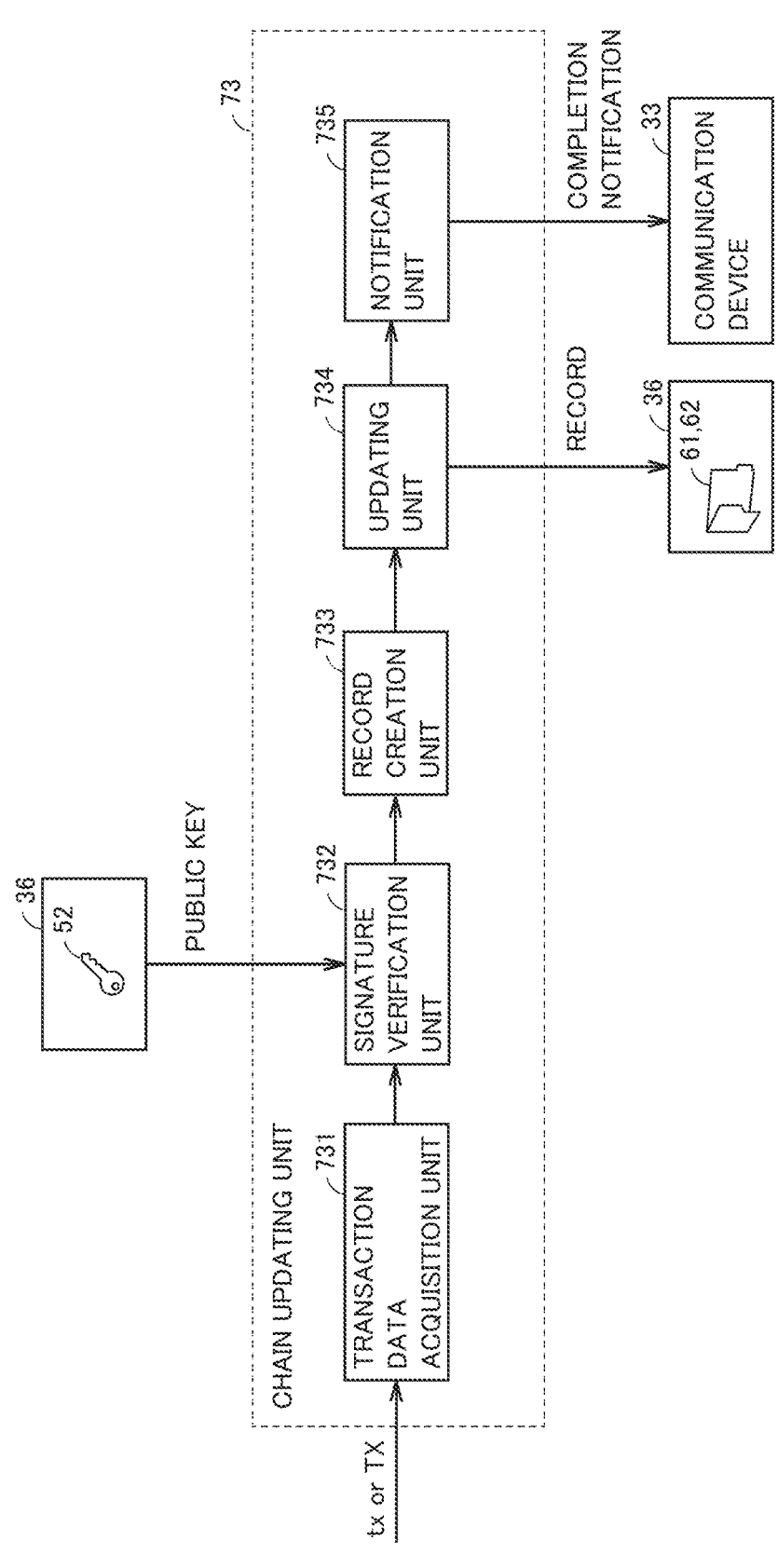
FIG. 8 is a functional block diagram of a chain updating unit.

FIG. 8 is a functional block diagram of chain updating unit 73. Chain updating unit 73 updates evidence chain 61 or time stamp chain 62 by adding a new record to evidence chain 61 or time stamp chain 62 in accordance with a transaction process. Here, evidence chain 61 will be illustratively described, but the same applies to time stamp chain 62 in the first embodiment. Chain updating unit 73 includes a transaction data acquisition unit 731, a signature verification unit 732, a record creation unit 733, an updating unit 734, and a notification unit 735.

Transaction data acquisition unit 731 acquires transaction data (tx) from network NW. Transaction data acquisition unit 731 outputs the transaction data to signature verification unit 732.

Signature verification unit 732 verifies the validity of the electronic signature included in the transaction data. As described above, the electronic signature is obtained by encrypting the file hash value using private key 51 of client server 3 that has transmitted it. First, signature verification unit 732 specifies, based on the transmitter information included in the transaction data, client server 3 that has transmitted the transaction data. Then, signature verification unit 732 reads out, from storage 36, the public key of the specified client server 3 among the plurality of public keys 52. Signature verification unit 732 uses the public key to decrypt the electronic signature included in the transaction data. Signature verification unit 732 compares the decrypted value with the file hash value included in the transaction data. When they are matched with each other, signature verification unit 732 recognizes the validity of the electronic signature and outputs its result to record creation unit 733.

When the validity of the electronic signature is recognized, record creation unit 733 creates, based on the transaction data, a record to be added to evidence chain 61. More specifically, record creation unit 733 acquires the key, the age, the file hash value, the nonce value, the electronic signature, the previous-record hash value, and the record hash value from the transaction data, and creates a record including these information. Record creation unit 733 outputs the record to updating unit 734.

Updating unit 734 updates evidence chain 61. More specifically, updating unit 734 makes reference to the key of the record from record creation unit 733, and specifies evidence chain 61 to which the record is to be added. Then, updating unit 734 adds the record to the specified evidence chain 61. When the updating of evidence chain 61 is completed, updating unit 734 reports it to notification unit 735.

Notification unit 735 outputs, to communication device 33, a control signal for notifying the completion of the transaction process. Thus, the completion of the transaction process is notified to client server 3 that has transmitted the transaction data.

<<Verification of Integrity of File>>

Figure 9:
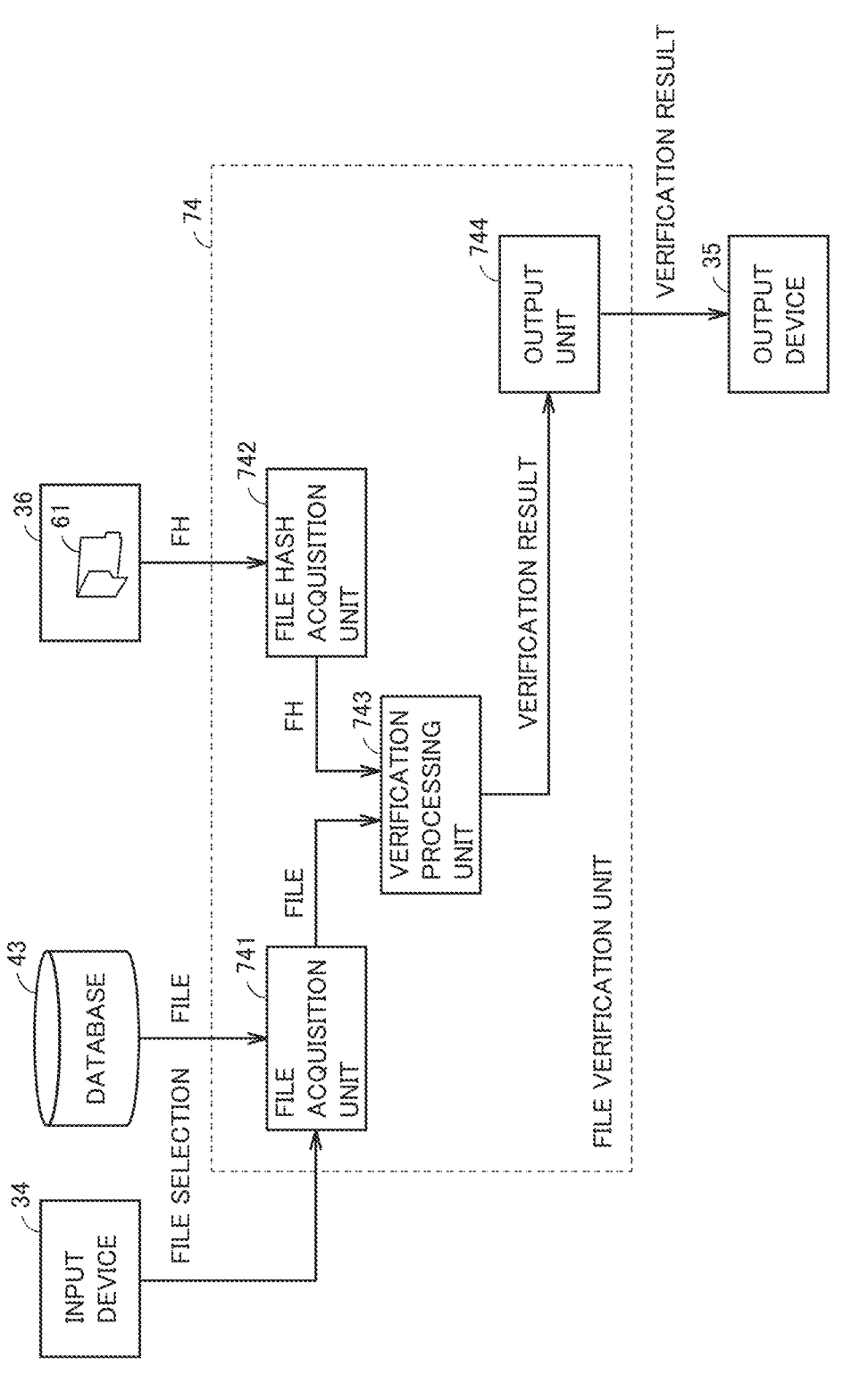
FIG. 9 is a functional block diagram of a file verification unit.

FIG. 9 is a functional block diagram of file verification unit 74. File verification unit 74 verifies the integrity (the file is not tampered with) of the file for which the record is stored in evidence chain 61. The target to be verified may be each of all the files in evidence chain 61 or may be a part, selected by the user, of the files. File verification unit 74 includes a file acquisition unit 741, a file hash acquisition unit 742, a verification processing unit 743, and an output unit 744.

File acquisition unit 741 receives, from input device 34 (or user terminal 42), a user operation for selecting a file that is a target to be verified. For example, the user first specifies an evidence chain 61. Then, the user may specify, as targets to be verified, all of a plurality of files for which records are stored in the evidence chain. Alternatively, the user may specify a part of the plurality of files as the target(s) to be verified. In this way, the file(s) that are target(s) to be verified are selected. File acquisition unit 741 acquires each of the selected file(s) from database 43 and outputs the acquired file to verification processing unit 743.

File hash acquisition unit 742 acquires a corresponding file hash value (FH), which is stored in evidence chain 61 in storage 36, for the file selected by the user. File hash acquisition unit 742 outputs the file hash value to verification processing unit 743.

Verification processing unit 743 determines whether or not the file has been tampered with, based on whether or not the file from file acquisition unit 741 is matched with the file hash value from file hash acquisition unit 742. More specifically, verification processing unit 743 hashes the file from file acquisition unit 741 using a hash function. Then, for each file, verification processing unit 743 compares the file hash value obtained by the hashing with the file hash value from file hash acquisition unit 742. When the two hash values are matched with each other in the case of a certain file, verification processing unit 743 determines that the file has not been tampered with (tampering not detected). On the other hand, when the two file hash values are not matched with each other in the case of another file, verification processing unit 743 determines that there is a possibility that the file has been tampered with (tampering detected). Verification processing unit 743 outputs the verification result (as to whether the tampering has been detected or not detected for each file, as to which file has been tampered with, etc.) to output unit 744.

Output unit 744 outputs, to output device 35 (or user terminal 42), the verification result provided by verification processing unit 743. Thus, the user can check the verification result(s) for the one or more files selected by the user.

<<Verification of Integrity of Confirmation Time>>

Figure 10:
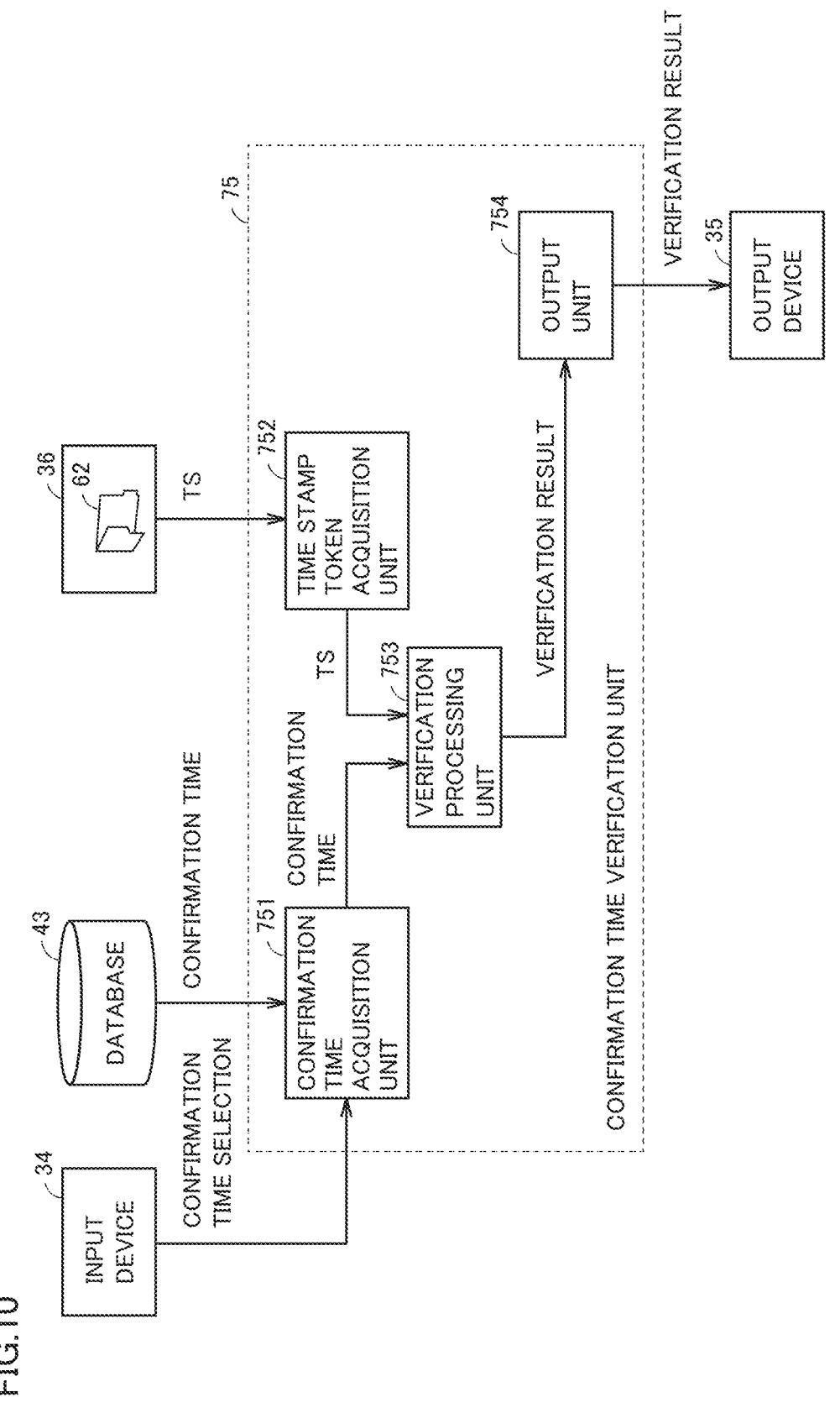
FIG. 10 is a functional block diagram of a confirmation time verification unit.

FIG. 10 is a functional block diagram of confirmation time verification unit 75. Confirmation time verification unit 75 verifies integrity of a confirmation time proven by a time stamp token (verifies that the confirmation time has not been tampered with). The target to be verified may be each of all the confirmation times in time stamp chain 62, or may be a part, selected by the user, of the confirmation times. Confirmation time verification unit 75 includes a confirmation time acquisition unit 751, a time stamp token acquisition unit 752, a verification processing unit 753, and an output unit 754.

Confirmation time acquisition unit 751 receives, from input device 34 (or user terminal 42), a user operation for selecting a confirmation time that is a target to be verified. For example, the user first specifies a time stamp chain 62. Then, the user may specify all of a plurality of confirmation times included in the time stamp chain as targets to be verified. Alternatively, the user may specify a part of the plurality of confirmation times as the target(s) to be verified. In this way, the confirmation time(s) as the target(s) to be verified are selected. As described later, the confirmation time(s) that are the target(s) to be verified may be automatically selected in accordance with a user operation for selecting a file. Confirmation time acquisition unit 751 acquires each of the selected confirmation time(s) from database 43, and outputs the acquired confirmation time to verification processing unit 753.

Time stamp token acquisition unit 752 acquires a corresponding time stamp token (TS), which is stored in time stamp chain 62 in storage 36, for the confirmation time selected by the user. Time stamp token acquisition unit 752 outputs the time stamp token to verification processing unit 753.

Verification processing unit 753 determines whether or not the confirmation time has been tampered with, based on whether or not the confirmation time from confirmation time acquisition unit 751 (database 43) is matched with the time stamp token from time stamp token acquisition unit 752 (time stamp chain 62). More specifically, verification processing unit 753 compares the confirmation time from confirmation time acquisition unit 751 with the time stamp token from time stamp token acquisition unit 752. When a certain confirmation time and a time stamp token corresponding to the confirmation time are matched with each other, verification processing unit 753 determines that the confirmation time has not been tampered with (tampering not detected). On the other hand, when another confirmation time and a time stamp token corresponding to the confirmation time are not matched with each other, verification processing unit 753 determines that there is a possibility that the confirmation time has been tampered with (tampering detected). Verification processing unit 753 outputs the verification result (as to whether the tampering has been detected or not detected for each confirmation time, as to which confirmation time has been tampered with, etc.) to output unit 754.

Output unit 754 outputs, to output device 35 (or user terminal 42), the verification result provided by verification processing unit 753. Thus, the user can check the verification result(s) for the one or more confirmation times selected by the user.

<<Verification of Sequence>>

Figure 11:
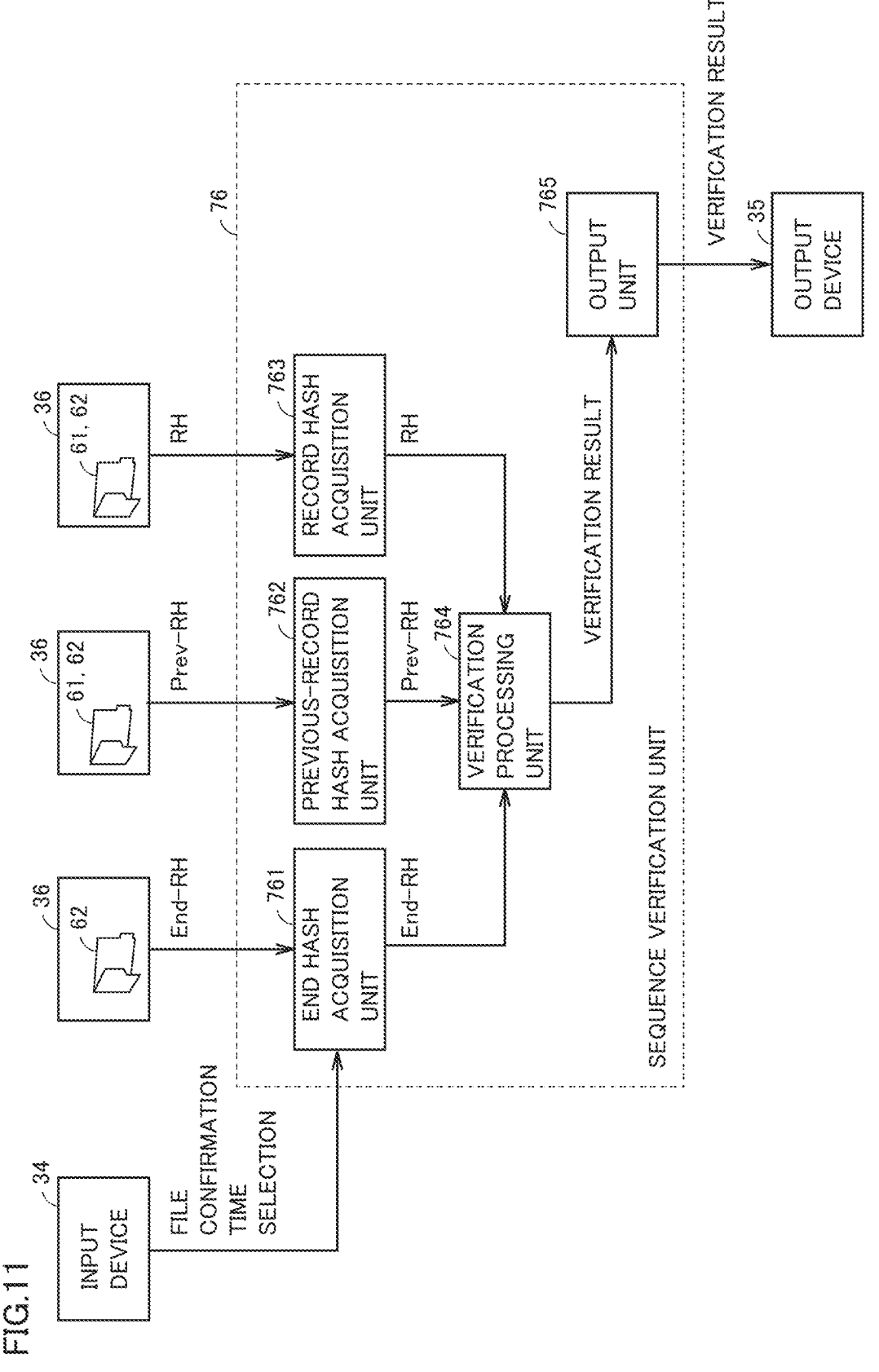
FIG. 11 is a functional block diagram of a sequence verification unit.

FIG. 11 is a functional block diagram of sequence verification unit 76. Sequence verification unit 76 verifies the sequence (how the files and/or the confirmation times are arranged temporally) of the files for which the records are stored in evidence chain 61 and/or the confirmation times proven by time stamp chain 62. Sequence verification unit 76 includes an end hash acquisition unit 761, a previous-record hash acquisition unit 762, a record hash acquisition unit 763, a verification processing unit 764, and an output unit 765.

First, the user performs, onto input device 34 (or user terminal 42), an operation for selecting a file and/or a confirmation time that are each a target to be verified. A manner of this selection is the same as the manner of selection described with reference to FIGS. 9 and 10. The following illustratively describes a situation in which a plurality of files and a plurality of confirmation times are selected. Each of end hash acquisition unit 761, previous-record hash acquisition unit 762, and record hash acquisition unit 763 is notified of which files and which confirmation times have been selected by the user.

End hash acquisition unit 761 acquires an end hash value (End-RH) of a record corresponding to each of the plurality of selected confirmation times from time stamp chain 62. Confirmation time acquisition unit 751 outputs the end hash value to verification processing unit 764.

Previous-record hash acquisition unit 762 acquires, from evidence chain 61, the previous-record hash value (Prev-RH) of the record corresponding to each of the plurality of selected files and acquires, from time stamp chain 62, the previous-record hash value of the record corresponding to each of the plurality of selected confirmation times. Previous-record hash acquisition unit 762 outputs the previous-record hash values to verification processing unit 764.

Record hash acquisition unit 763 acquires, from evidence chain 61, the record hash value (RH) of the record corresponding to each of the plurality of selected files and acquires, from time stamp chain 62, the record hash value of the record corresponding to each of the plurality of selected confirmation times. Record hash acquisition unit 763 outputs the record hash values to verification processing unit 764.

Verification processing unit 764 verifies a temporal arrangement (preceding-succeeding relation) of the plurality of selected files and the plurality of selected confirmation times based on the end hash value from end hash acquisition unit 761, the previous-record hash value from previous-record hash acquisition unit 762, and the record hash value from record hash acquisition unit 763. As described with reference to FIGS. 3 and 4, the arrangement (parent-child relation) of the records in the same chain can be specified based on the previous-record hash value and the record hash value. Further, the arrangement of the records between the different chains can be specified based on the end hash value and the record hash value. Accordingly, verification processing unit 764 can specify the sequence of the plurality of files and the plurality of confirmation times. Verification processing unit 764 outputs the verification result (temporal arrangement of the plurality of files and the plurality of confirmation times) to output unit 765.

Output unit 765 outputs, to output device 35 (or user terminal 42), the verification result provided by verification processing unit 764. Thus, the user can check the verification result for the one or more files selected by the user and/or the one or more confirmation times.

It should be noted that here, the situation has been illustratively described in which the plurality of files and the plurality of confirmation times are selected. Only the plurality of files may be selected and the confirmation times may not be selected. Alternatively, only the plurality of confirmation times may be selected and the files may not be selected. Also in these cases, it is readily understood by those skilled in the art from the above description that the sequence of all the records can be specified.

<Process Flow>

Figure 12:
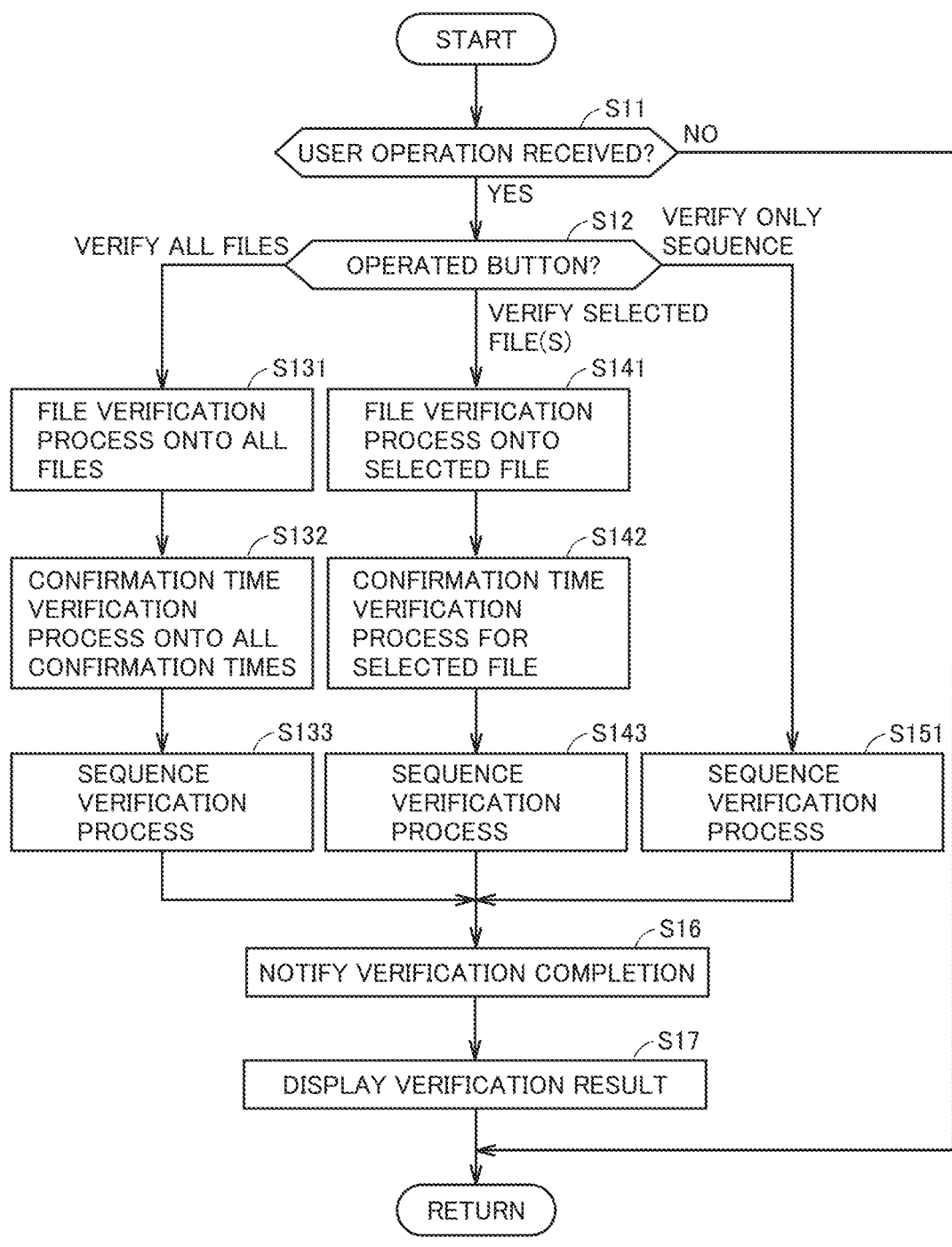
FIG. 12 is a flowchart showing a process procedure of a whole of verification processes according to the first embodiment.

FIG. 12 is a flowchart showing an exemplary process procedure of a whole of the verification processes according to the first embodiment. The process shown in this flowchart is invoked from a main routine and is executed when a predetermined condition is satisfied (for example, at predetermined intervals). Each step is implemented by software processing by client server 3 (processor 31), but may be implemented by hardware (electric circuitry) disposed in client server 3. Hereinafter, the term "step" will be abbreviated as "S". The same applies to a flowchart in the below-described second embodiment.

In S11, client server 3 determines whether or not input device 34 or user terminal 42 has received a user operation for selecting a verification function.

Figure 13:
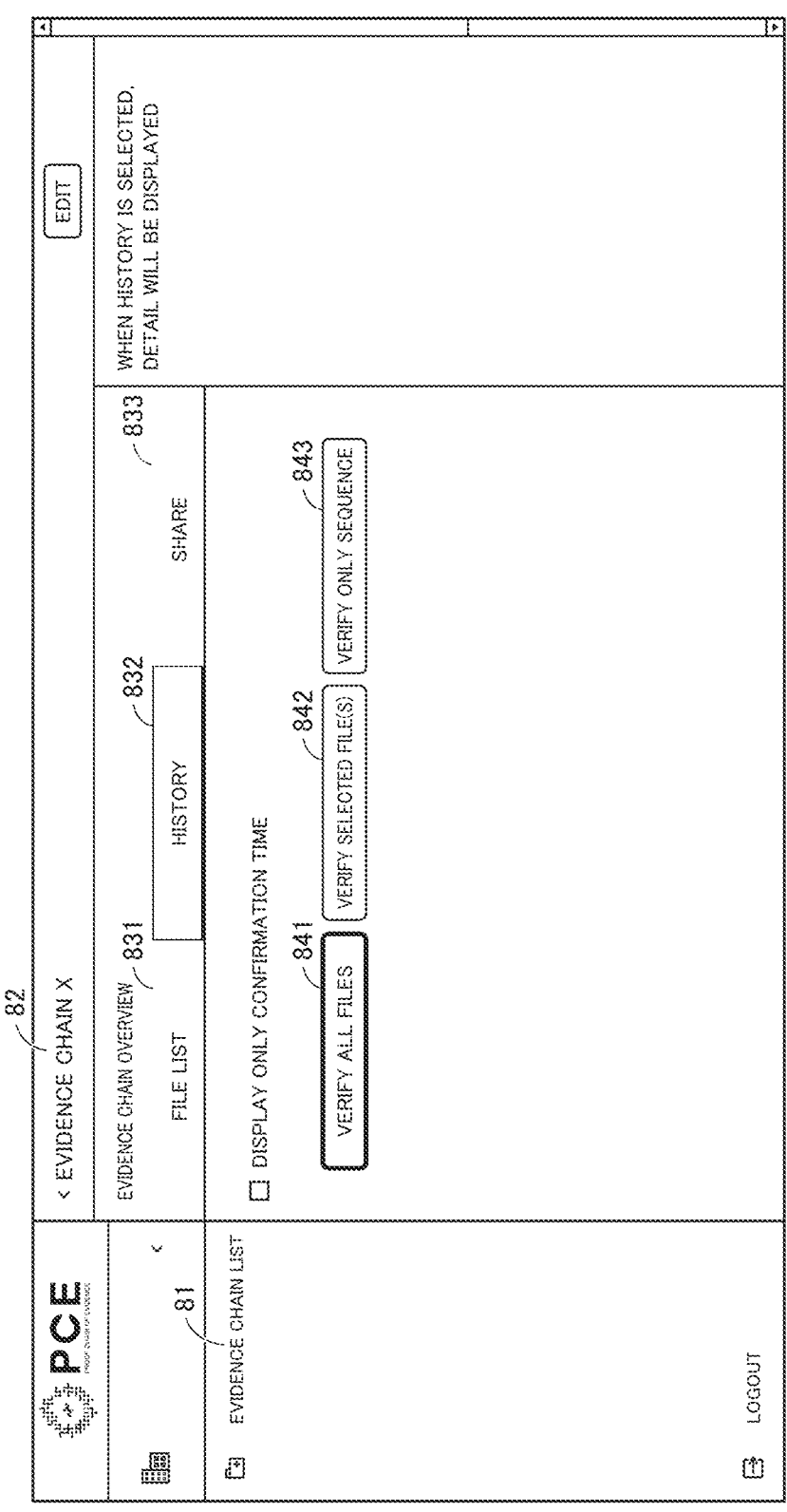
FIG. 13 is a diagram showing an exemplary user interface for allowing a user to select a verification function.

FIG. 13 is a diagram showing an exemplary user interface (UI) for allowing the user to select a verification function. This UI is displayed on output device 35 or user terminal 42.

For example, the UI has: a navigation list 81 indicating a selectable evidence chain; and a field 82 indicating an evidence chain selected by the user. In this example, an "evidence chain X" is selected. The UI further has, for example, three tabs 831 to 833. Tab 831 is a tab for displaying a list of files. Tab 832 is a tab for displaying a history. Tab 833 is a tab for file sharing.

When tab 832 for displaying the history is selected, three buttons 841 to 843 each for selecting one of three types of verification functions are displayed. Button 841 is a "VERIFY ALL FILES" button. Button 842 is a "VERIFY SELECTED FILE(S)" button. Button 843 is a "VERIFY ONLY SEQUENCE" button. In FIG. 13, "VERIFY ALL FILES" is selected by operating button 841.

Referring to FIGS. 12 and 13, when input device 34 or user terminal 42 does not receive a user operation (more specifically, operation on any one of buttons 841 to 843) (NO in S11), client server 3 returns the process to the main routine without performing subsequent processes.

When input device 34 or user terminal 42 receives a user operation (YES in S11), client server 3 advances the process to S12, and determines which of buttons 841 to 843 is operated by the user.

When button 841 for instructing to verify all the files is operated ("VERIFY ALL FILES" in S12), client server 3 performs: a file verification process onto all the files (S131); a confirmation time verification process onto all the confirmation times (S132); and a sequence verification process (S133). These processes are performed in any order. The file verification process, the confirmation time verification process, and the sequence verification process are implemented by file verification unit 74 (see FIG. 9), confirmation time verification unit 75 (see FIG. 10), and sequence verification unit 76 (see FIG. 11), respectively.

After performing the three verification processes, client server 3 notifies the user that the verification processes have been completed (S16). Client server 3 may display, on output device 35 (or user terminal 42), a message indicating that the verification processes have been completed, or may transmit, to user terminal 42, a mail indicating that the verification processes have been completed. Then, client server 3 displays the verification result on output device 35 (or user terminal 42) (S17).

Returning to S12, when button 842 for instructing to verify each of the selected file(s) is operated ("VERIFY SELECTED FILE(S)" in S12), client server 3 performs: a file verification process onto the selected file (S141); and a confirmation time verification process onto the selected confirmation time (S142). Then, client server 3 notifies completion of the verification to the user (S16), and displays the verification result on output device 35 (or user terminal 42) (S17).

When button 843 for instructing to verify only the sequence is operated ("VERIFY ONLY SEQUENCE" in S12), client server 3 performs the sequence verification process (S151). Then, client server 3 notifies completion of the verification to the user (S16), and displays the verification result on output device 35 or user terminal 42 (S17).

It should be noted that the file verification process, the confirmation time verification process, and the sequence verification process respectively correspond to the "first verification process" to the "third verification process" according to the present disclosure. The operation on button 842 for instructing to verify the selected file(s) corresponds to the "first user operation" according to the present disclosure. The operation on button 841 for instructing to verify all the files corresponds to the "second user operation" according to the present disclosure. The operation on button 843 for instructing to verify only the sequence corresponds to the "third user operation" according to the present disclosure.

<Display of Verification Result>

The following describes how the UI on which the verification result is displayed differs depending on which one of "VERIFY ALL FILES", "VERIFY SELECTED FILE(S)", and "VERIFY ONLY SEQUENCE" is selected.

<<Verify All Files>>

Figure 14:
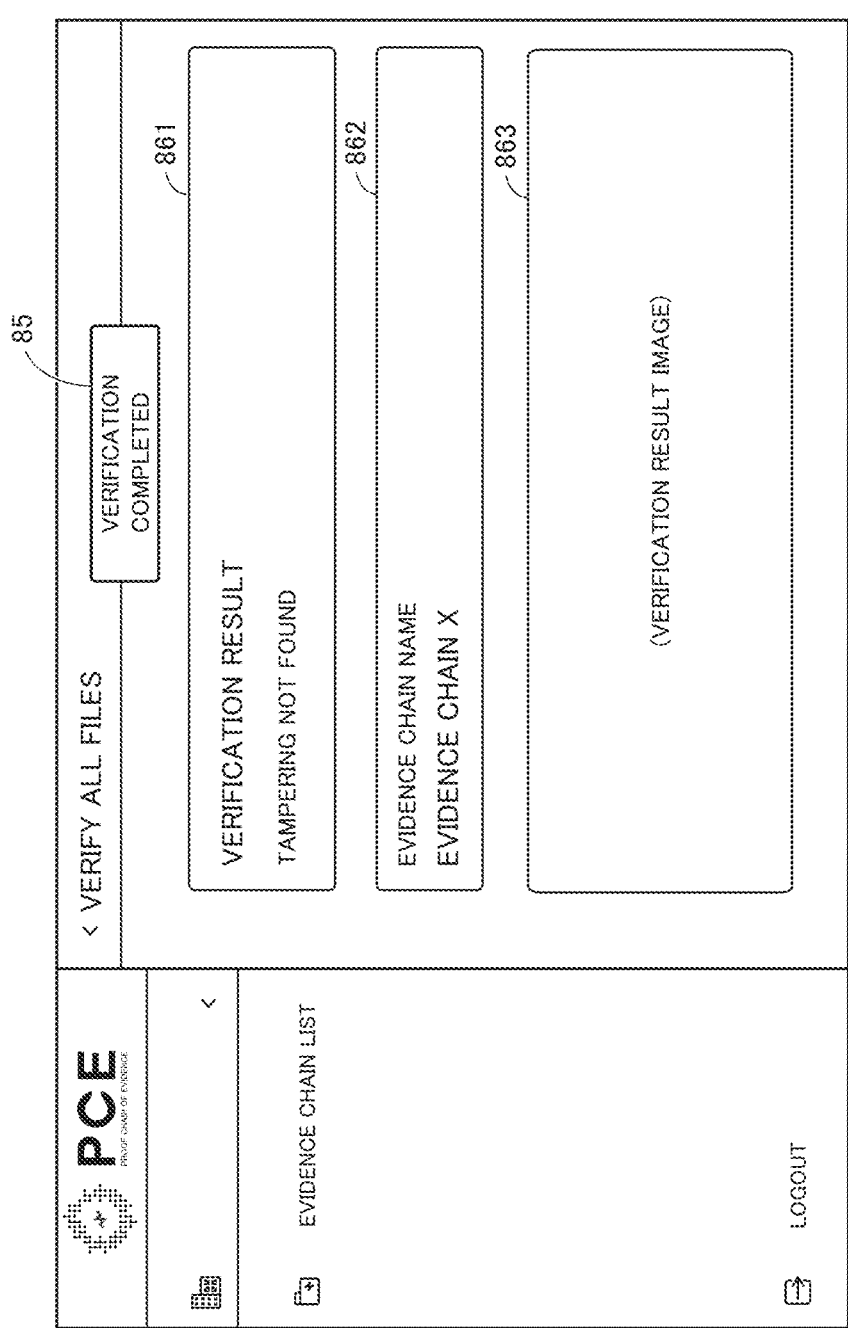
FIG. 14 is a diagram showing an exemplary user interface in which verification results are displayed when "VERIFY ALL FILES" is selected.

FIG. 14 is a diagram showing an exemplary UI in which verification results are displayed when "VERIFY ALL FILES" is selected. When the verification process is completed, a notification 85 indicating "VERIFICATION COMPLETED" as well as a first box 861, a second box 862, and a third box 863 are displayed.

First box 861 shows a summary (conclusion) of the verification results. For example, when a tampering is found in any record (file or confirmation time), a message indicating "TAMPERING FOUND" is displayed in first box 861. On the other hand, when no tampering is found in any record, a message indicating "TAMPERING NOT FOUND" is displayed in first box 861 as shown in FIG. 14.

Second box 862 shows an evidence chain that is a target for the verification process. In the example shown in FIG. 14, "EVIDENCE CHAIN X" is displayed in second box 862.

Third box 863 graphically shows details of the verification result. As described with reference to FIGS. 3 and 4, the ages of the files and the ages of the confirmation times are managed independently of each other in the different chains. In the description of the verification result below, the ages of the files are suffixed with A, and the ages of the confirmation times are suffixed with B, thereby distinguishing them from each other. However, this distinction is to facilitate understanding while avoiding confusion, and is not essential.

Figure 15:
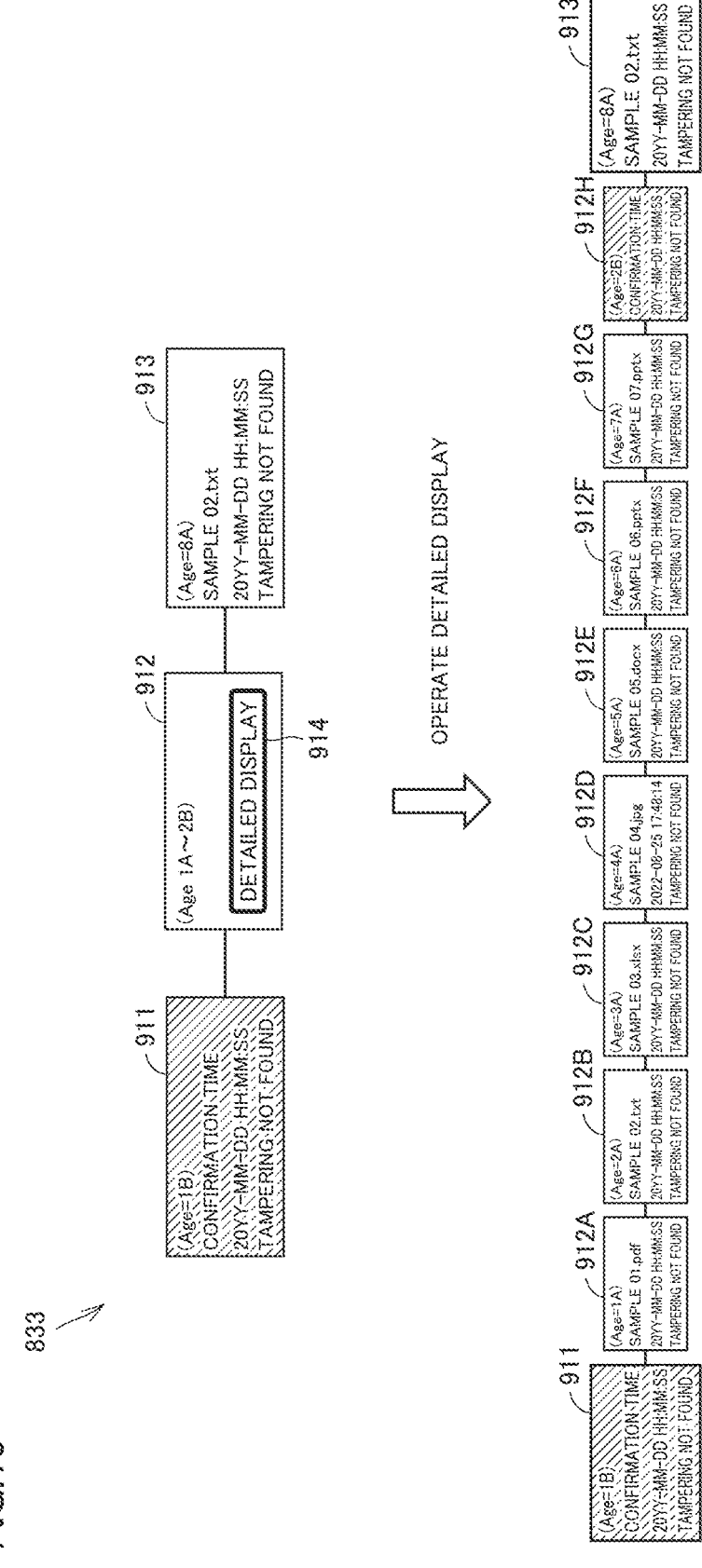
FIG. 15 is a diagram showing exemplary display of the verification results in a third box when "VERIFY ALL FILES" is selected.

FIG. 15 is a diagram showing exemplary display of the verification result in third box 863 when "VERIFY ALL FILES" is selected. Here, a situation in which three or more files are selected is assumed. In this case, for example, a section 911 showing a verification result of a start record and a section 913 showing a verification result of an end record are displayed. In the example shown in FIG. 15, section 911 shows a verification result by the confirmation time verification process as to whether or not the confirmation time with Age=1B has been tampered with. Section 913 shows a verification result by the file verification process as to whether or not the file with Age=8A has been tampered with.

On the other hand, regarding records between the start record and the end record, a blank section 912 including no verification result (whether or not each of the files or confirmation times with Age=1A to 2B has been tampered with) is displayed. That is, the records between the start record and the end record are not displayed. When the user selects a detailed-display button 914 in section 912, sections 912A to 912H showing verification results of the intermediate records are displayed. The arrangement of the files and the confirmation times in sections 911, 912A to 912H, and 913 is time series that is based on the result of the sequence verification process. Thus, since the records between the start record and the end record are not displayed to simplify the display as a whole, the user is facilitated to understand outlines of the verification results. It should be noted that when only one or two files are selected, intermediate section 912 is not displayed.

In "VERIFY ALL FILES", the verification results for all the files and all the confirmation times are displayed. Therefore, "VERIFY ALL FILES" is particularly effective when a trouble (suspected tampering) occurs between users. This is because a user can present all the verification results to the other user to persuade the other user.

In the example shown in FIG. 15, the size of each of sections 911 and 913 at the both ends is larger than the size of each of intermediate sections 912A to 912H. Thus, each of the section indicating the verification result of the start record and the section indicating the verification result of the end record is desirably displayed to be larger than the section indicating the verification result of each of the records between the start record and the end record. Thus, the user can readily check the verification results for the start record and the end record.

Further, the manner of display of the section showing the verification result as to whether the file has been tampered with is desirably different from the manner of display of the section showing the verification result as to whether the confirmation time has been tampered with. In FIG. 15, the difference in the manner of display is expressed by presence and absence of hatchings. Thus, the user can readily distinguish the verification result as to whether or not the file has been tampered with from the verification result as to whether or not the confirmation time has been tampered with.

Particularly, the section showing the verification result as to whether or not the confirmation time has been tampered with is displayed in a more emphasized manner than the section showing the verification result as to whether or not the file has been tampered with. Thus, the user can readily distinguish the verification result for the confirmation time from the verification result for the file, and can readily check it. This is due to the following reason: generally, even though the number of provided confirmation times is smaller than the number of registered files, the confirmation times more frequently contribute to resolving troubles.

As a method of displaying in the emphasized manner, various well-known methods can be employed. For example, different colors may be used for both the sections. The verification result as to whether or not the confirmation time has been tampered with can be displayed in an emphasized manner by using characteristics that are based on a combination of colors (warm color/cold color, advancing color/retreating color, expanding color/contracting color, or the like). Further, the section showing the verification result as to whether or not the confirmation time has been tampered with may be displayed in a dark color, whereas the section showing the verification result as to whether or not the file has been tampered with may be displayed in a light color. Even when the colors of the same system are used, a degree of emphasis is strong in the case of the dark color, and a degree of emphasis is weak in the case of the light color. Alternatively, the section showing the verification result as to whether or not the confirmation time has been tampered with may be displayed larger than the section showing the verification result as to whether or not the file has been tampered with. A frame may be added only to the section showing the verification result as to whether or not the confirmation time has been tampered with. Only the section showing the verification result as to whether or not the confirmation time has been tampered with may blink.

Further, in the example shown in FIG. 15, year, month, day, hour, minute, and second are displayed as the confirmation time. However, the user may be allowed to select to display only a part of them. In accordance with a user operation, for example, only the year may be displayed, only the year and the month may be displayed, or only the year, the month and the day may be displayed. Since the user is allowed to appropriately select a temporal granularity, the user can readily check a confirmation time with a required granularity.

<<Verify Selected File(s)>>

Figure 16:
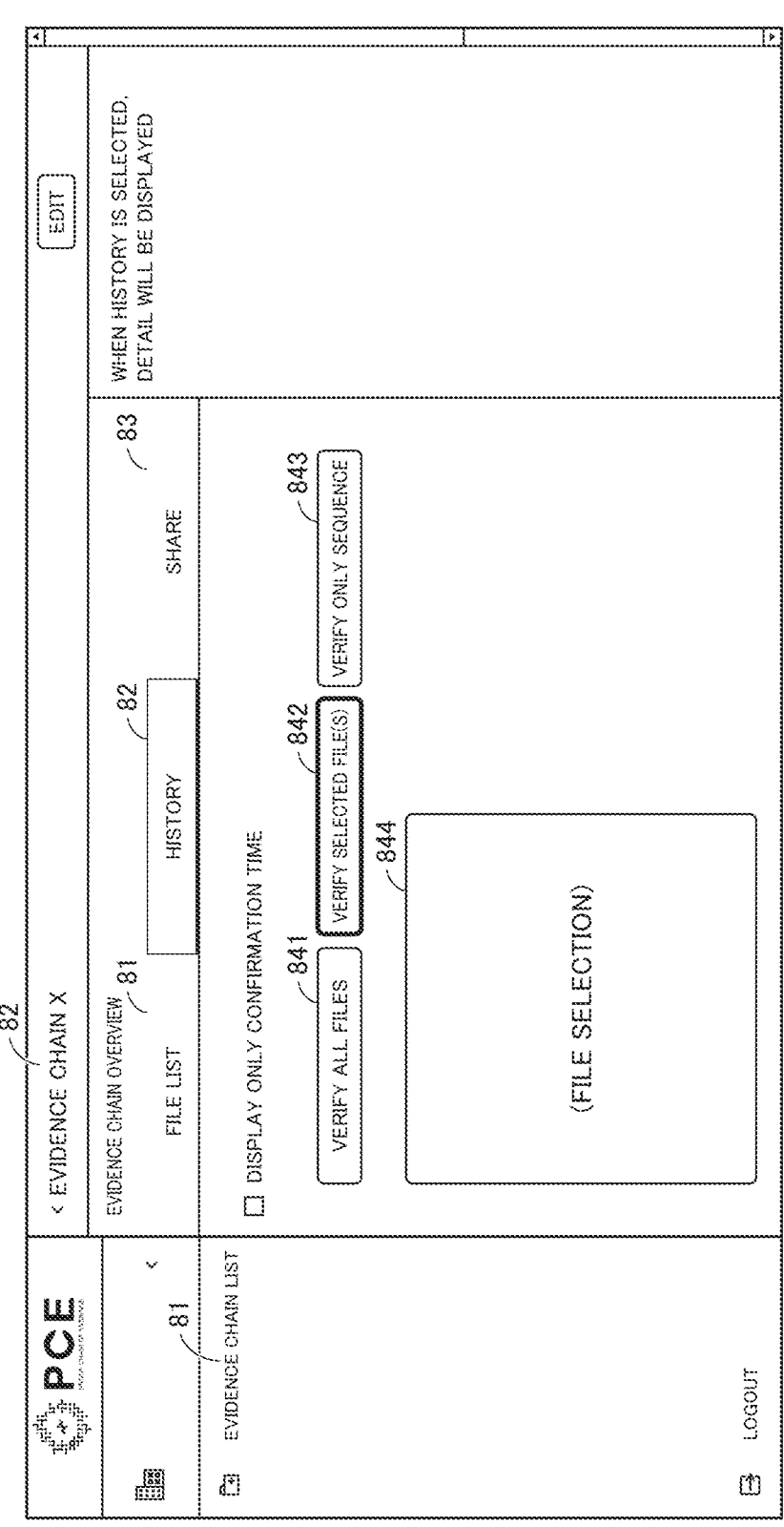
FIG. 16 is a diagram showing an exemplary UI displayed before starting the verification processes when "VERIFY SELECTED FILE(S)" is selected.

FIG. 16 is a diagram showing an exemplary UI displayed before starting the verification process when "VERIFY SELECTED FILE(S)" is selected. When button 842 for instructing "VERIFY SELECTED FILE(S)" is operated, a file selection box 844 for allowing the user to select file(s) that are target(s) to be verified is displayed.

FIG. 17 is a diagram showing exemplary display (first example) in a file selection box 844. In file selection box 844, the names of files for which file hash values are stored in selected evidence chain 61, and associated confirmation times are displayed in an ascending order or descending order (descending order in FIG. 17), for example. The user selects a file by checking a check box beside the name of the file. In the present embodiment, the confirmation times are automatically selected in accordance with the selected files.

In the example shown in FIG. 17, a file with Age=17A and a file with Age=16A are selected by the user. In this case, a confirmation time with Age=4B immediately after the latest file with Age=17A of the plurality of files selected by the user and a confirmation time with Age=3B immediately before the oldest file with Age=16A of the plurality of files selected by the user are automatically selected. It should be noted that the confirmation time "immediately after" the latest file is a confirmation time after the latest file and closest to the latest file in the temporal arrangement of the files and the confirmation times. The confirmation time "immediately before" the oldest file is a confirmation time before the oldest file and closest to the latest file in the temporal arrangement of the files and the confirmation times.

Figure 18:
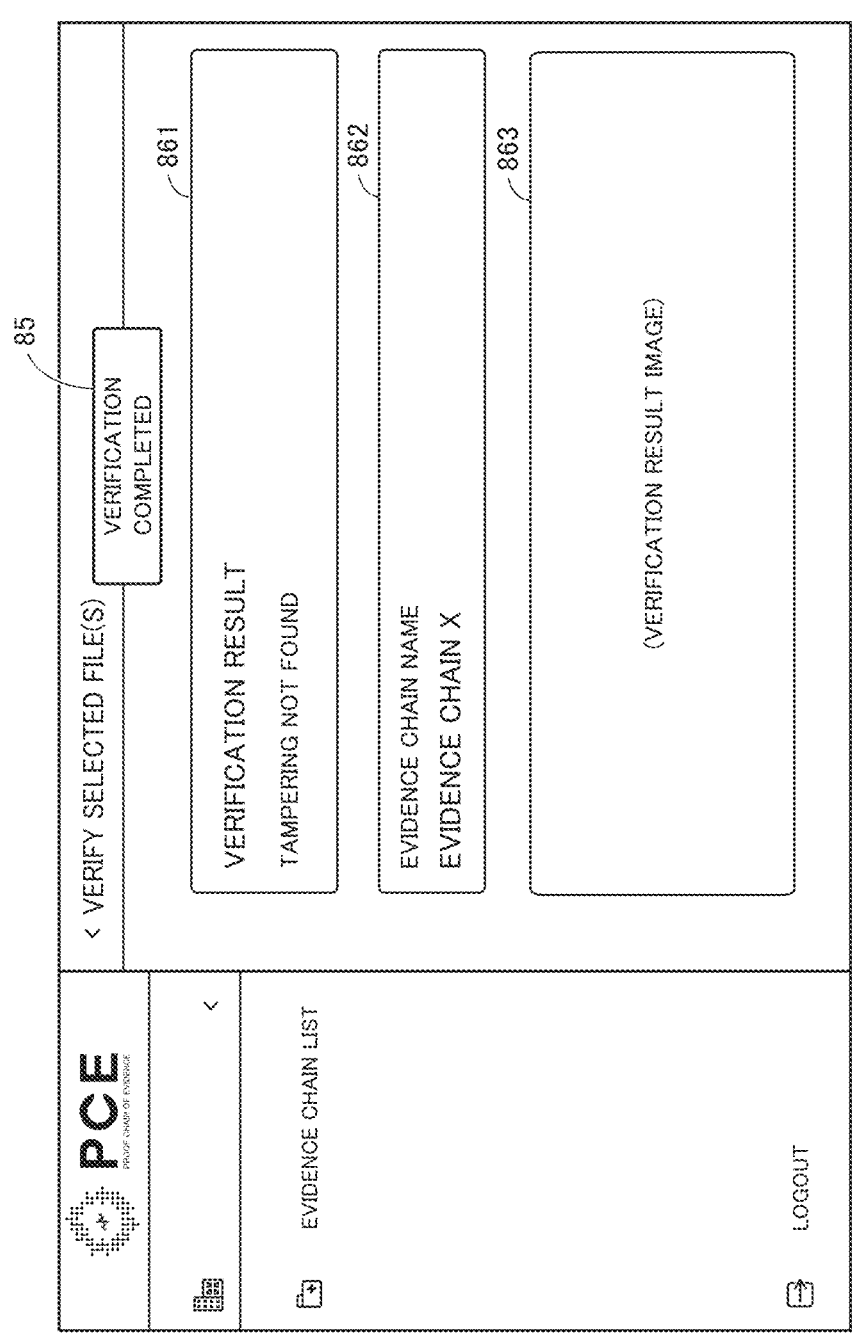
FIG. 18 is a diagram showing an exemplary UI in which verification results are displayed when "VERIFY SELECTED FILE(S)" is selected.

FIG. 18 is a diagram showing an exemplary UI in which verification results are displayed when "VERIFY SELECTED FILE(S)" is selected. Similarly to when "VERIFY ALL FILES" is selected (see FIG. 14), details of the verification results is displayed in third box 863.

Figure 19:
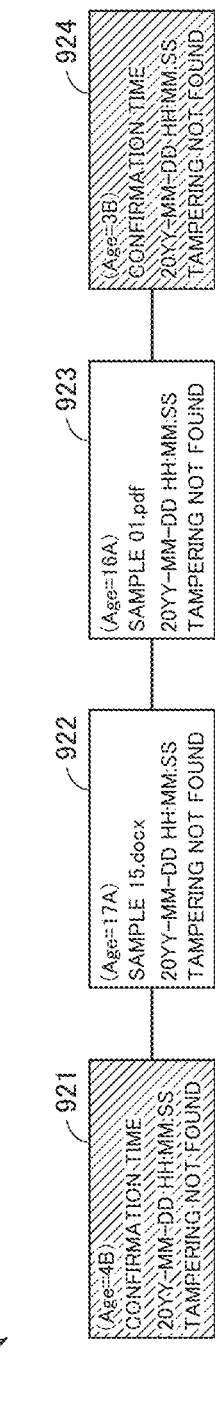
FIG. 19 is a diagram showing exemplary detailed display of the verification results in the third box when "VERIFY SELECTED FILE(S)" is selected.

FIG. 19 is a diagram showing exemplary detailed display of the verification results in third box 863 when "VERIFY SELECTED FILE(S)" is selected. When files are selected as described with reference to FIG. 17, at least four sections 921 to 924 are displayed as shown in FIG. 19.

Section 921 shows a verification result by the confirmation time verification process for the automatically selected confirmation time with Age=4B. Section 922 shows a verification result by the file verification process for the file selected by the user with Age=17A. Section 923 shows a verification result by the file verification process for the file selected by the user with Age=16A. Section 924 shows a verification result by the confirmation time verification process for the automatically selected confirmation time with Age=3B.

Thus, in the example shown in FIG. 17, the targets to be verified are: the file selected by the user with Age=16A; the file also selected by the user with Age=17A; the confirmation time with Age=3B immediately before the oldest file; and the confirmation time with Age=4B immediately after the latest file (see FIG. 19). Thus, it can be proven that the file with Age=16A and the file with Age=17A were stored in distributed ledger 6 (evidence chain 61) between the confirmation time with Age=3B and the confirmation time with Age=4B. Therefore, according to the present embodiment, the sequence of the files and the confirmation times can be effectively verified by a simple user operation. It should be noted that FIG. 17 illustratively shows that the two files are selected; however, three or more files may be selected.

Figure 20:
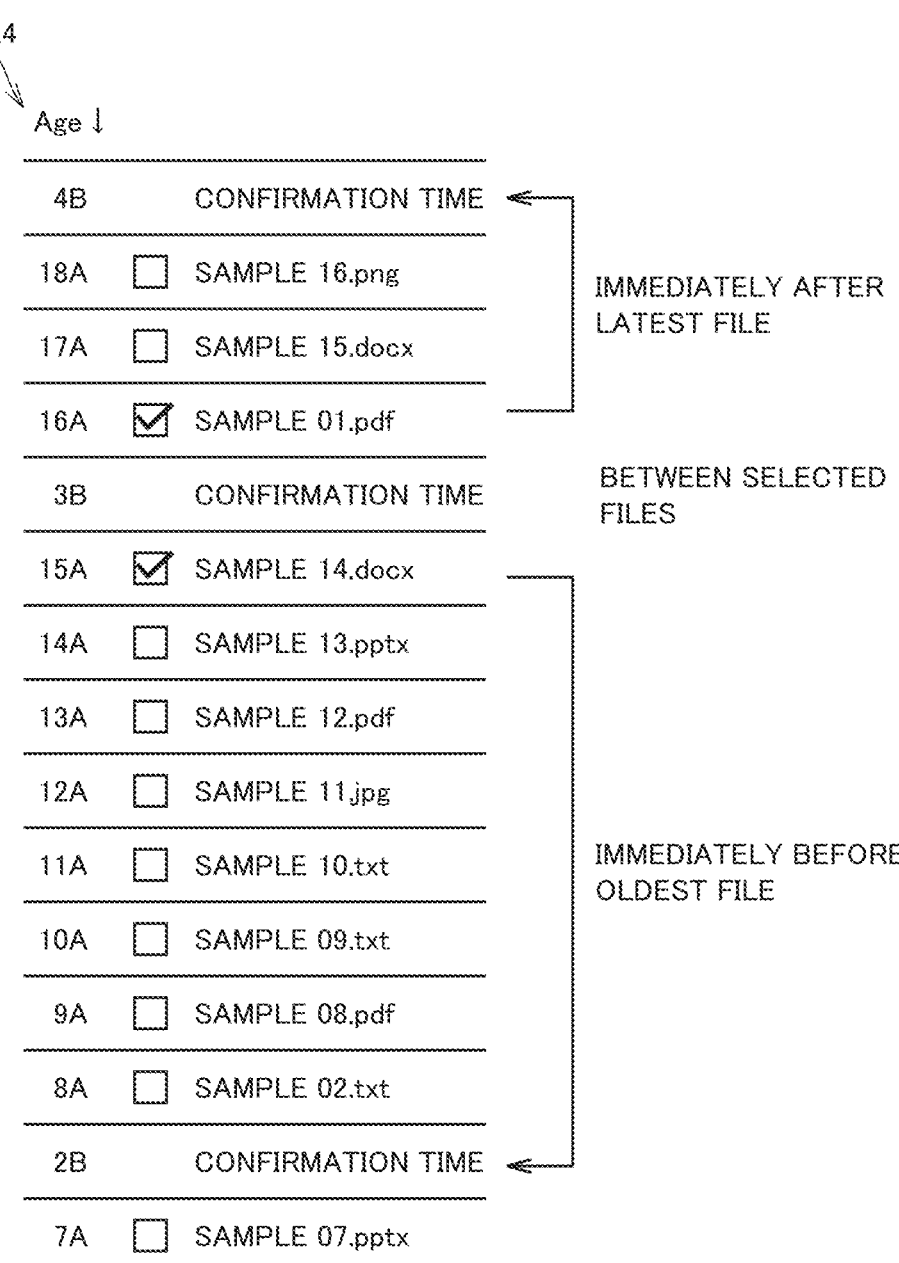
FIG. 20 is a diagram showing another exemplary display in the file selection box.

FIG. 20 is a diagram showing another exemplary display (second example) in file selection box 844. In the example shown in FIG. 20, the file with Age=16A and a file with Age=15A are selected by the user. In this case, the confirmation time with Age=2B immediately before the oldest file and the confirmation time with Age=4B immediately after the latest file are automatically selected. Moreover, the confirmation time with Age=3B between the latest file and the oldest file is also automatically selected.

Figure 21:
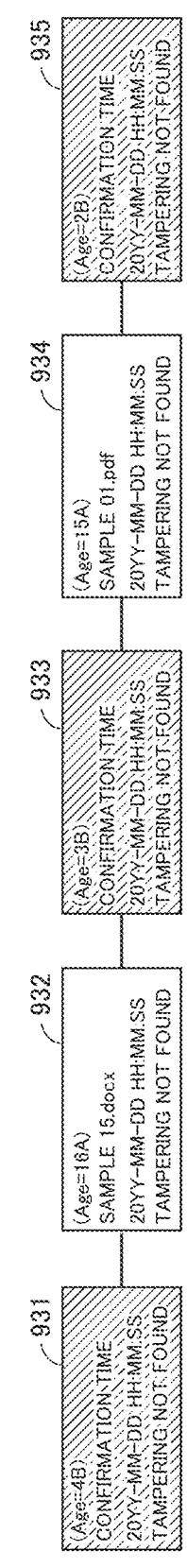
FIG. 21 is a diagram showing another exemplary detailed display of the verification results in the third box when "VERIFY SELECTED FILE(S)" is selected.

FIG. 21 is a diagram showing another exemplary detailed display of the verification results in third box 863 when "VERIFY SELECTED FILE(S)" is selected. When files are selected as described with reference to FIG. 20, at least five sections 931 to 935 are displayed as shown in FIG. 21.

Section 931 shows a verification result by the confirmation time verification process for the automatically selected confirmation time with Age=4B. Section 932 shows a verification result by the file verification process for the file selected by the user with Age=16A. Section 933 shows a verification result by the confirmation time verification process for the automatically selected confirmation time with Age=3B. Section 934 shows a verification result by the file verification process for the file selected by the user with Age=15A. Section 935 shows a verification result by the confirmation time verification process for the automatically selected confirmation time with Age=2B.

In "VERIFY SELECTED FILE(S)", the verification results for the files selected by the user (and the confirmation times automatically selected based thereon) are displayed. In other words, in "VERIFY SELECTED FILE(S)", verifications for files not selected (and confirmation times automatically selected based thereon) are not performed. Therefore, a time required for "VERIFY SELECTED FILE(S)" is shorter than a time required for "VERIFY ALL FILES". Therefore, "VERIFY SELECTED FILE(S)" is particularly effective in a case where ranges of files or confirmation times that can be in trouble (suspected tampering) are narrowed in advance.

In the example shown in FIG. 20, the confirmation time with Age=3B exists between the file with Age=15A and the file with Age=16A. In this case, as shown in FIG. 21, temporal arrangement between the file with Age=15A and the confirmation time with Age=3B is proven and temporal arrangement between the file with Age=16A and the confirmation time with Age=3B is proven. Therefore, according to the present embodiment, the sequence of the files and the confirmation times can be verified more in detail.

<<Verify Only Sequence>>

Figure 22:
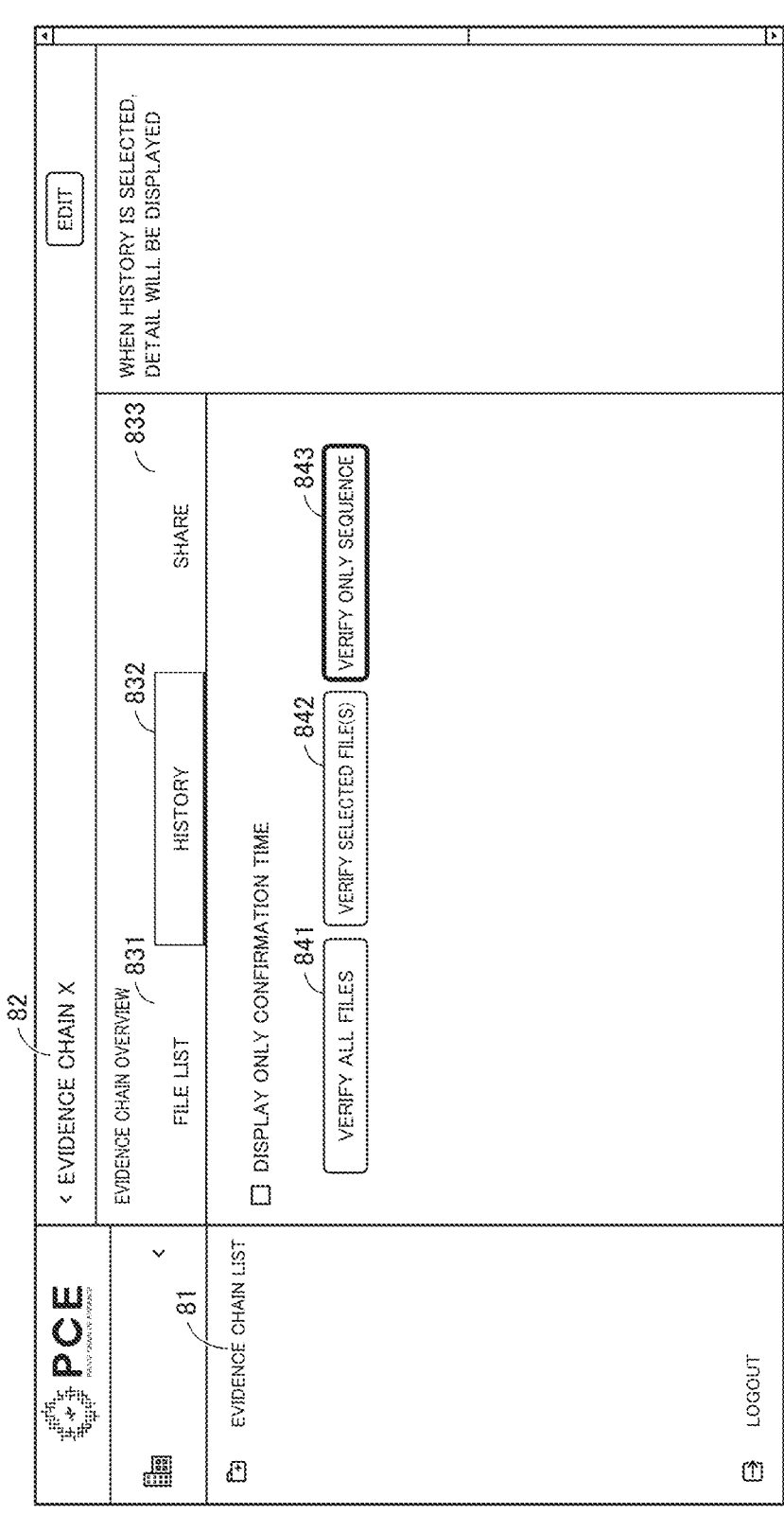
FIG. 22 is a diagram showing an exemplary user interface displayed before starting the verification process when "VERIFY ONLY SEQUENCE" is selected.

FIG. 22 is a diagram showing an exemplary UI displayed before starting the verification process when "VERIFY ONLY SEQUENCE" is selected. When button 843 for instructing "VERIFY ONLY SEQUENCE" is operated, the sequence of all the files (and, accordingly, all the confirmation times) for which the records are stored in the corresponding evidence chain is verified. On the other hand, the integrity of each of the files and the integrity of each of the confirmation times are not verified.

Figure 23:
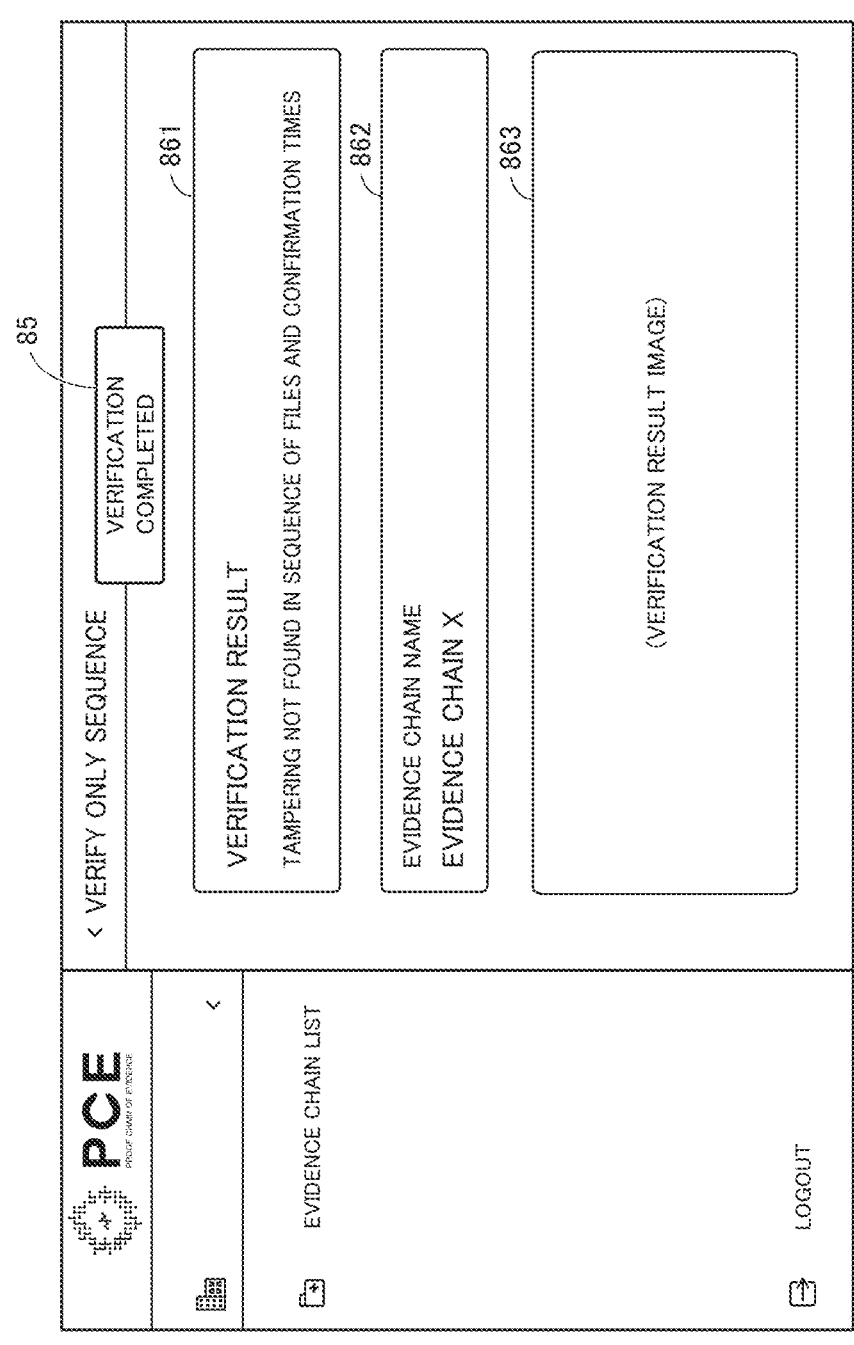
FIG. 23 is a diagram showing an exemplary user interface in which verification results are displayed when "VERIFY ONLY SEQUENCE" is selected.

FIG. 23 is a diagram showing an exemplary UI in which verification results are displayed when "VERIFY ONLY SEQUENCE" is selected. As with the case where "VERIFY ALL FILES" or "VERIFY SELECTED FILE(S)" is selected (see FIGS. 14 and 18), details of the verification results are graphically displayed in third box 863.

Figure 24:
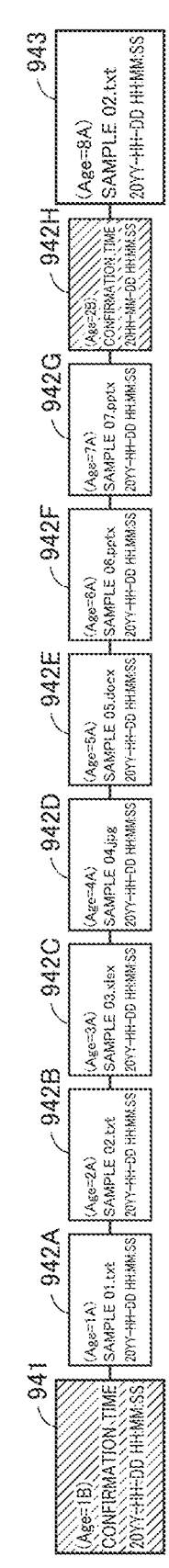
FIG. 24 is a diagram showing exemplary detailed display of the verification results in the third box when "VERIFY ONLY SEQUENCE" is selected.

FIG. 24 is a diagram showing exemplary detailed display of the verification results in third box 863 when "VERIFY ONLY SEQUENCE" is selected. Referring to the same example as in FIG. 15, a section 941 showing a verification result of a start record, sections 942A to 942H each showing a verification result of an intermediate record, and a section 943 showing a verification result of an end record are displayed in time series based on the result of the sequence verification process. On the other hand, a message indicating "TAMPERING FOUND" or "TAMPERING NOT FOUND" is not displayed in each section.

As described above, in the first embodiment, client server 3 is configured to perform the file verification process, the confirmation time verification process, and the sequence verification process. The integrity of each file (whether or not the file has been tampered with) can be verified by the file verification process. The integrity of each confirmation time (whether or not the confirmation time has been tampered with) can be verified by the confirmation time verification process. The sequence of the files and the confirmation times in distributed ledger 6 can be verified by the sequence verification process. Therefore, according to the first embodiment, it is possible to verify whether or not the files and the confirmation times are appropriately managed.

Client server 3 is configured to allow the user to select any one of "VERIFY ALL FILES", "VERIFY SELECTED FILE(S)", and "VERIFY ONLY SEQUENCE". Thus, verification requested by the user can be performed at a timing desired by the user.

When "VERIFY ALL FILES" is selected, the integrity of each of all the files and the integrity of each of all the confirmation times are verified. This makes it possible to thoroughly verify the integrity of each of the files and the confirmation times. When "VERIFY SELECTED FILE(S)" is selected, the target to be verified is limited to a part, selected by the user, of the files and/or the confirmation times. Thus, verification cost (the number of processes, time, system load, etc.) can be appropriately reduced. When "VERIFY ONLY SEQUENCE" is selected, the sequence of the files and the confirmation times is selectively verified. This makes it possible to efficiently verify the sequence when the verification of integrity is not required.

Second Embodiment

In the first embodiment, it has been illustratively described that one time stamp chain 62 is associated with one evidence chain 61 (see FIG. 4). In the second embodiment, it will be illustratively described that one time stamp chain is associated with a plurality of evidence chains. Configurations of a data management system and a client server according to the second embodiment are the same as those of data management system 1 and client server 3 according to the first embodiment (see FIGS. 1 and 2).

<Distributed Ledger>

FIG. 25 is a diagram showing an exemplary data structure of distributed ledger 6 according to the second embodiment. In this example, three evidence chains 63X, 63Y, 63Z are associated with one time stamp chain 64. Each of evidence chains 63X, 63Y, 63Z is the same as evidence chain 61 (see FIG. 3) described in the first embodiment. Hereinafter, for simplicity, evidence chains 63X, 63Y, 63Z are also referred to as evidence chains X, Y, Z, respectively.

Time stamp chain 64 includes eight records R41 to R48 in this example. Each record includes a key (Key), an age (Age), data (Data), a nonce value (Nonce), an electronic signature (Sig), a previous-record hash value (Prev-RH), and a record hash value (RH), as with the record stored in time stamp chain 62 (see FIG. 3) in the first embodiment. Time stamp chain 64 differs from time stamp chain 62 in that the end hash value(s) of one, two or three of three evidence chains X, Y, Z are stored as the end hash values (records R41, R43, R45, R47). The other information included in time stamp chain 64 is the same as the corresponding information of time stamp chain 62.

Figure 26:
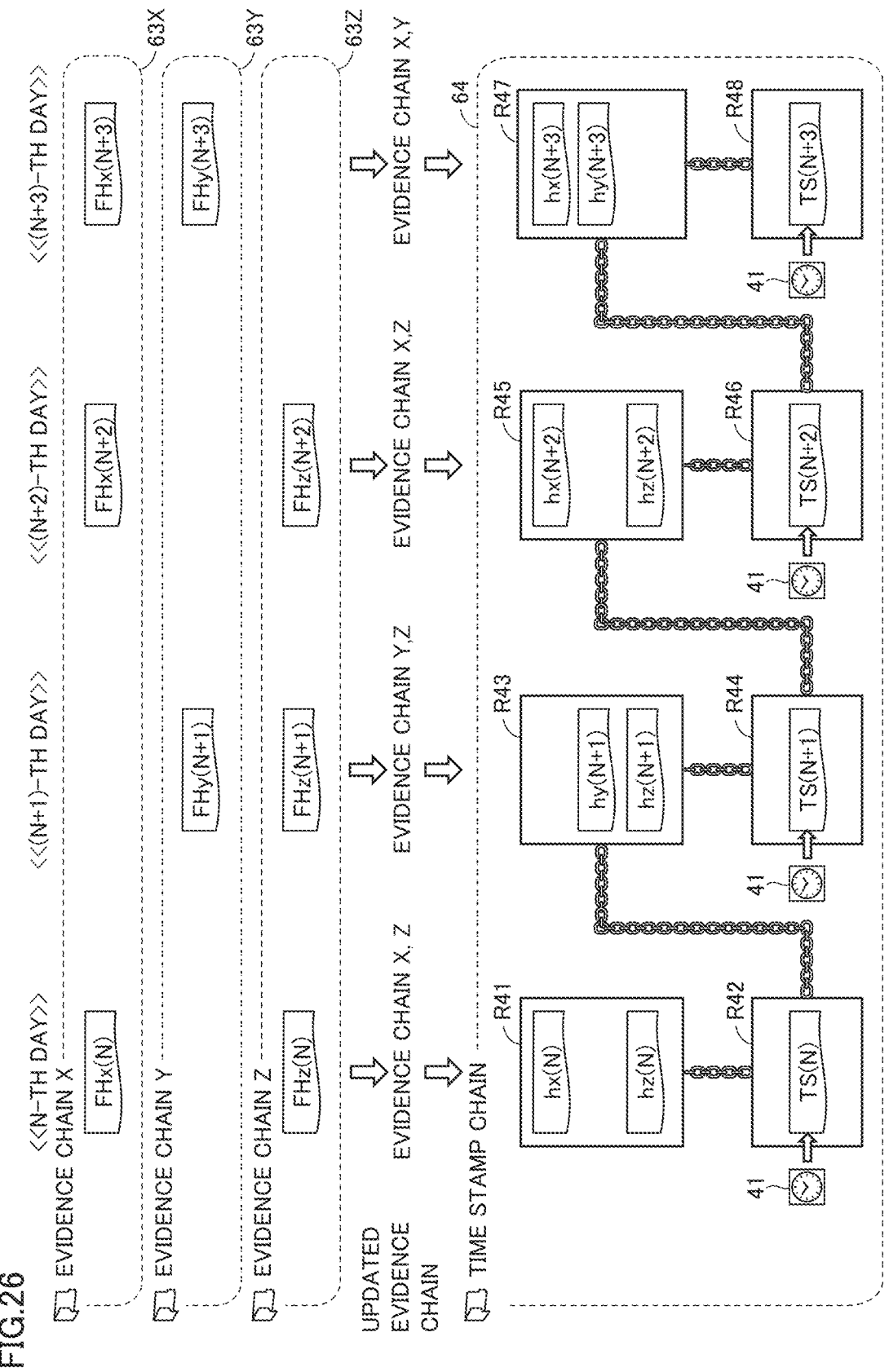
FIG. 26 is a conceptual diagram for illustrating a relation between records stored in evidence chains and a time stamp chain in the second embodiment.

FIG. 26 is a conceptual diagram for illustrating a relation between the records stored in evidence chains X, Y, Z and time stamp chain 64 in the second embodiment. In the second embodiment, an updating process to update time stamp chain 64 is repeatedly performed. The updating process can be performed whenever a predetermined period of time has elapsed. In this example, the updating process is performed once a day.

On the other hand, each of evidence chains X, Y, Z is not necessarily updated every day. Therefore, in the second embodiment, only information for an evidence chain having been updated from the previous execution of the updating process (that is, the previous day) among evidence chains X, Y, Z is stored into time stamp chain 64. Referring to FIGS. 25 and 26, the following describes how time stamp chain 64 is updated each day. It should be noted that in FIG. 26, the file hash value (FH), the end hash value (h), and the time stamp token (TS) stored as the data (Data) in each of the records are shown, whereas the previous-record hash value and the record hash value are not shown in order to avoid complication of the illustration.

<<N-th Day>>

It is assumed that only evidence chains X, Z are updated on the N-th day. Evidence chain X stores: a new file hash value FHx (N); and an end hash value hx(N) of evidence chain X generated based on file hash value FHx (N). Similarly, evidence chain Z stores: a new file hash value FHz(N); and an end hash value hz(N) of evidence chain Z generated based on file hash value FHz(N).

Client server 3 stores, into end record R41 of time stamp chain 64 on that occasion, end hash value hx(N) of evidence chain X on the N-th day and end hash value hz(N) of evidence chain Z on the N-th day. Further, client server 3 generates an end hash value H(N) based on end hash value hx(N) and end hash value hz(N) (as well as the other information (the age, the nonce value, the electronic signature, etc.) stored in end record R41), and stores the generated end hash value H(N) into record R41 as a record hash value. It should be noted that end hash value H(N) is an exemplary "end value" according to the present disclosure.

Moreover, client server 3 acquires time stamp token TS (N) for end hash value H(N) from TSA 41. Client server 3 stores time stamp token TS (N), previous-record hash value H(N), and record hash value H(N+1) into record R42.

<<(N+1)-th Day>>

It is assumed that only evidence chains Y, Z are updated on the (N+1)-th day. Evidence chain Y stores: a new file hash value FHy(N+1); and an end hash value hy(N+1) of evidence chain Y generated based on file hash value FHy(N+1). Evidence chain Z stores: a new file hash value FHz(N+1); and an end hash value hz(N+1) of evidence chain Z generated based on file hash value FHz(N+1).

Client server 3 stores, into end record R43 of time stamp chain 64 on that occasion, end hash value hy(N+1) of evidence chain Y on the (N+1)-th day and end hash value hz(N+1) of evidence chain Z on the (N+1)-th day. Further, client server 3 generates an end hash value H(N+2) of time stamp chain 64 based on end hash value hy(N+1) and end hash value hz(N+1) (as well as the other information stored in end record R43), and stores the generated end hash value H(N+2) into record R43 as a record hash value.

Moreover, client server 3 acquires time stamp token TS(N+1) for end hash value H(N+2) from TSA 41. Client server 3 stores time stamp token TS(N+1), previous-record hash value H(N+2), and record hash value H(N+3) into record R44.

<<(N+2)-th Day and (N+3)-th Day>>

Each of the (N+2)-th day and the (N+3)-th day is the same as the (N+1)-th day and therefore will not be described repeatedly in detail.

<Functional Block>

Client server 3 (processor 31) according to the second embodiment has a chain updating unit that updates time stamp chain 64 by adding a new record to time stamp chain 64 by the transaction process as with the first embodiment. The chain updating unit according to the second embodiment includes a record creation unit unlike chain updating unit 73 (see FIG. 8) according to the first embodiment.

Figure 27:
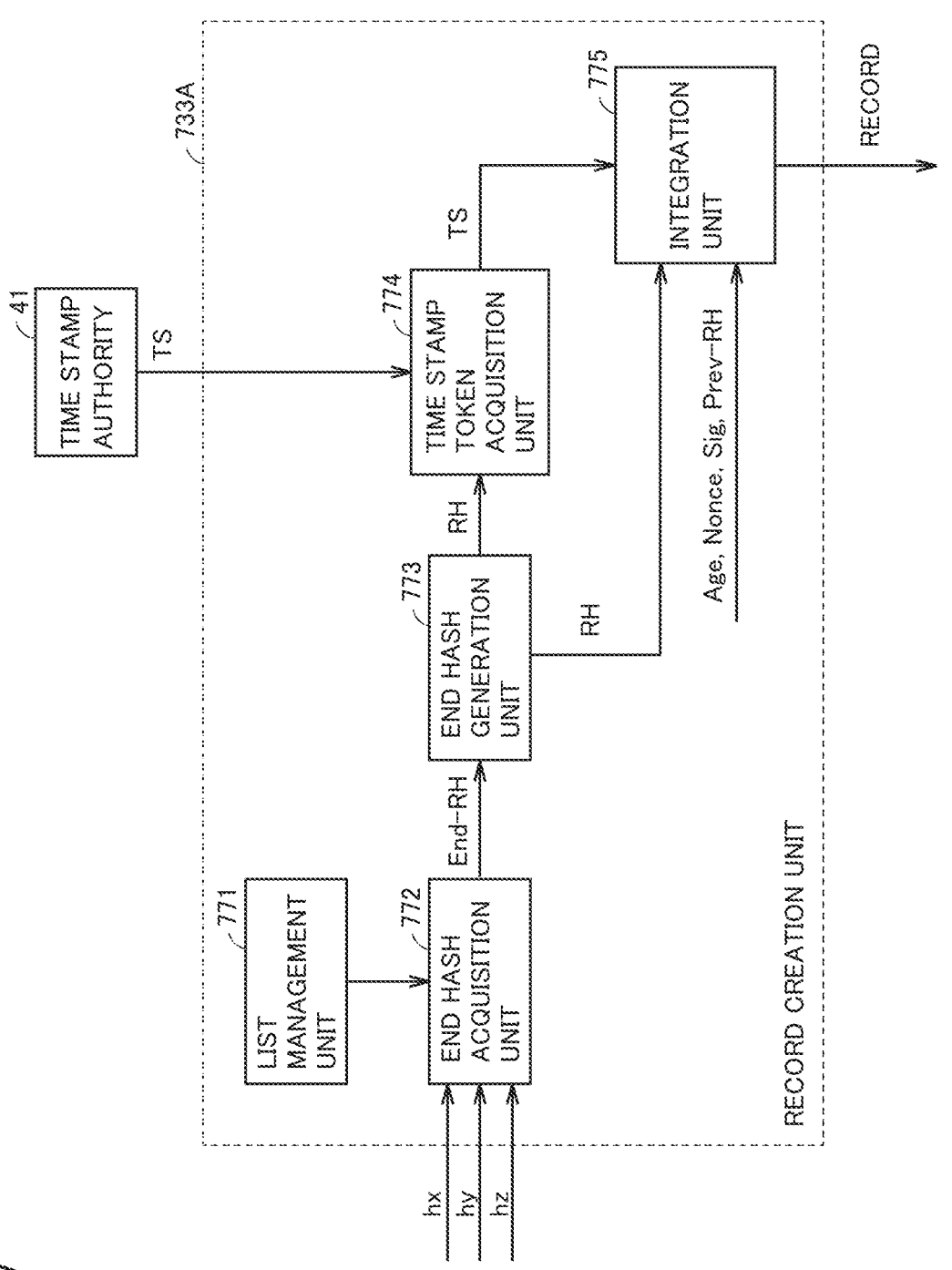
FIG. 27 is a functional block diagram of a record creation unit according to the second embodiment.

FIG. 27 is a functional block diagram of a record creation unit 733A according to the second embodiment. Record creation unit 733A creates a record to be added to time stamp chain 64, for example, every predetermined period (one day in this example). Record creation unit 733A includes a list management unit 771, an end hash acquisition unit 772, an end hash generation unit 773, a time stamp token acquisition unit 774, and an integration unit 775.

List management unit 771 manages a list that records which evidence chain has been updated in a period of time from the previous execution of the updating process to the current execution of the updating process. Whenever any of the evidence chains is updated, list management unit 771 adds the updated evidence chain to the list. List management unit 771 outputs, to end hash acquisition unit 772, management information that is in the form of the list.

In accordance with the management information in the form of the list, end hash acquisition unit 772 acquires, as End-RH, the end hash value (at least one of hx, hy and hz) of the evidence chain updated in the period of time from the previous execution of the updating process to the current execution of the updating process. End hash acquisition unit 772 outputs the end hash value of the evidence chain to end hash generation unit 773.

End hash generation unit 773 generates the end hash value (RH) of time stamp chain 64 based on the end hash value (End-RH) of the evidence chain. End hash generation unit 773 may generate the end hash value of time stamp chain 64 by hashing the end hash value from end hash acquisition unit 772. End hash generation unit 773 outputs the end hash value of time stamp chain 64 to time stamp token acquisition unit 774 and integration unit 775.

From TSA 41, time stamp token acquisition unit 774 acquires a time stamp token (TS) for the record hash value of the record of time stamp chain 64 including the end hash value from end hash generation unit 773. Time stamp token acquisition unit 723 stores the time stamp token into database 43 (or storage 36) as the confirmation time (not shown). Moreover, time stamp token acquisition unit 723 outputs the time stamp token to integration unit 775.

Integration unit 775 generates a record by integrating various types of information. Specifically, integration unit 775 generates a record by integrating the end hash value or time stamp token of time stamp chain 64 with the other information (the age (Age), the nonce value (Nonce), the electronic signature (Sig), and the previous-record hash value (Prev-RH)). Integration unit 775 outputs the record to updating unit 734 (see FIG. 8).

<Process Flow>

Figure 28:
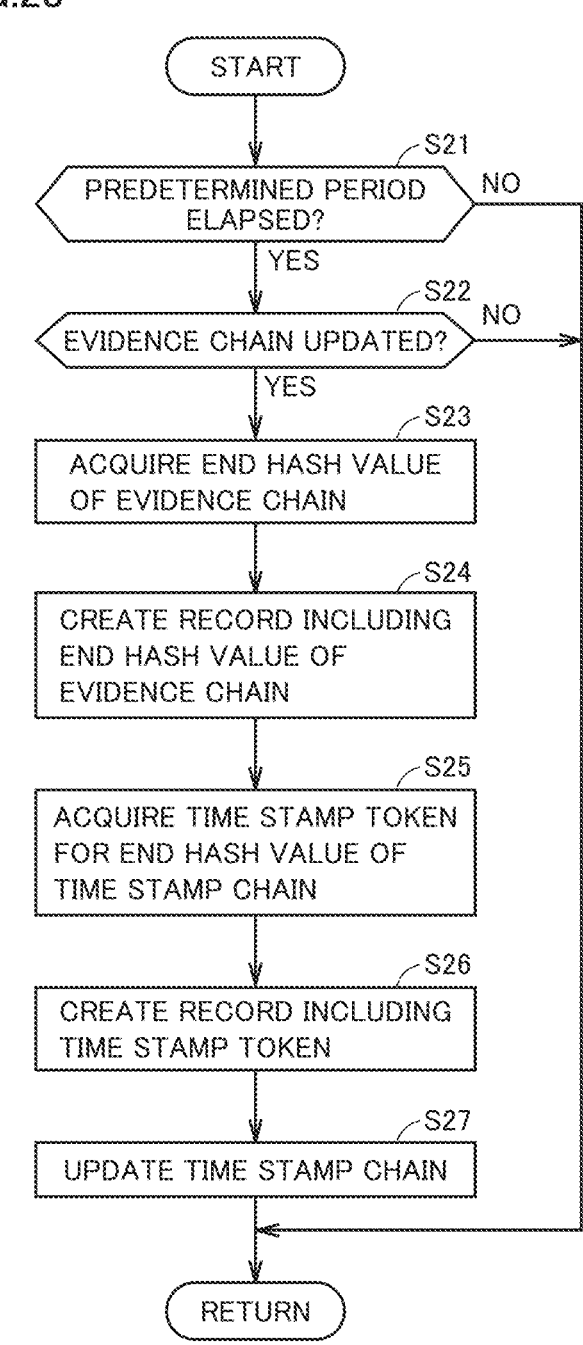
FIG. 28 is a flowchart showing an exemplary process procedure of an updating process to update the time stamp chain according to the second embodiment.

FIG. 28 is a flowchart showing an exemplary process procedure of the updating process to update time stamp chain 64 according to the second embodiment. In S21, client server 3 determines whether or not a predetermined period has elapsed since the previous execution of the updating process. When the predetermined period has not elapsed (NO in S21), client server 3 returns the process to the main routine. When the predetermined period has elapsed (YES in S22), client server 3 advances the process to S22.

In S22, client server 3 makes reference to, for example, the above-described list so as to determine whether or not there is an updated evidence chain in the period of time from the previous execution of the updating process to the current execution of the updating process. When there is no updated evidence chain (NO in S22), client server 3 returns the process to the main routine. When there is an updated evidence chain (YES in S22), client server 3 advances the process to S23.

In S23, client server 3 acquires the end hash value of the evidence chain updated in the period of time from the previous execution of the updating process to the current execution of the updating process.

In S24, client server 3 generates the record hash value (the end hash value on that occasion) of time stamp chain 64 based on the end hash value of the evidence chain. Then, client server 3 creates a first record (R41, R43, R45, R47 in the example of FIGS. 25 and 26) including the end hash value of the evidence chain and the end hash value of time stamp chain 64.

In S25, from TSA 41, client server 3 acquires a time stamp token for the end hash value of time stamp chain 64 (the record hash value of the first record).

In S26, client server 3 generates a record hash value based on the time stamp token and the other information. Then, client server 3 creates a second record (R42, R44, R46, R48 in the example of FIGS. 25 and 26) including the time stamp token, the previous-record hash value (the record hash value of the first record), and the generated record hash value.

In S27, client server 3 updates time stamp chain 64 by adding the two newly created records.

Also in the second embodiment, as with the first embodiment, client server 3 is configured to perform the file verification process, the confirmation time verification process, and the sequence verification process. These verification processes are the same as those of the first embodiment, and therefore will not be described repeatedly in detail. According to the second embodiment, it is also possible to verify whether or not the files and the confirmation times are appropriately managed.

Further, in the second embodiment, the time stamp token is acquired for the evidence chain for which the file (file hash value) has been changed from the previous execution of the updating process, whereas the time stamp token is not acquired for the evidence chain for which the file has not been changed. Thus, time stamp token acquisition cost (the number of processes, time, system load, etc.) can be reduced as compared with a case where the time stamp token is acquired for each of all the evidence chains or a case where the time stamp token is acquired whenever a file is changed. Therefore, according to the second embodiment, it is possible to efficiently verify whether or not the files and the confirmation times are appropriately managed.

Moreover, in the second embodiment, the updating process is performed regularly (once a day in the example shown in FIG. 26). Thus, verification cost can be reduced as compared with a case where the updating process is performed whenever a file is changed. Moreover, reliable verification is possible for a long term as compared with a case where the updating process is performed irregularly.

Although the embodiments of the present disclosure have been described and illustrated in detail, it is clearly understood that the same is by way of illustration and example only and is not to be taken by way of limitation. The scope of the present disclosure is defined by the terms of the claims, and is intended to include any modifications within the scope and meaning equivalent to the terms of the claims.

What is claimed is:

1. A data management apparatus comprising:
a storage that stores a distributed ledger in which one or more hash values and one or more time stamp tokens are stored in time series, the one or more hash values respectively being generated from one or more files, the one or more time stamp tokens proving one or more confirmation times; and
a processor for performing a plurality of verification processes for the one or more files and the one or more confirmation times, the plurality of verification processes including first to third verification processes, wherein
the first verification process is a process of verifying whether or not the one or more files used to generate the one or more hash values have been tampered with,
the second verification process is a process of verifying whether or not the one or more confirmation times proven by the one or more time stamp tokens have been tampered with, and
the third verification process is a process of verifying a sequence of the one or more files and the one or more confirmation times, wherein
in response to receiving a first predetermined user operation from an input device, the processor performs the third verification process and does not perform the first verification process and the second verification process.

2. The data management apparatus according to claim 1, wherein when a second predetermined user operation is performed on the input device, the processor performs the first to third verification processes on a part, selected by the user, of the one or more files and the one or more confirmation times.

3. The data management apparatus according to claim 2, wherein when two or more files are selected by the user, the processor at least verifies an oldest file, a confirmation time immediately before the oldest file, a latest file, and a confirmation time immediately after the latest file.

4. The data management apparatus according to claim 3, wherein when there is another confirmation time between the two or more files, the processor further verifies the other confirmation time.

5. The data management apparatus according to claim 1, wherein when a second predetermined user operation is performed on the input device, the processor performs the first to third verification processes to all of the one or more files and the one or more confirmation times.

6. A data management apparatus comprising:
a storage that stores a distributed ledger in which one or more hash values and one or more time stamp tokens are stored in time series, the one or more hash values respectively being generated from one or more files, the one or more time stamp tokens proving one or more confirmation times; and
a processor that performs a plurality of verification processes for the one or more files and the one or more confirmation times, the plurality of verification processes including first to third verification processes, wherein
the first verification process is a process of verifying whether or not the one or more files used to generate the one or more hash values have been tampered with,
the second verification process is a process of verifying whether or not the one or more confirmation times proven by the one or more time stamp tokens have been tampered with, and the third verification process is a process of verifying a sequence of the one or more files and the one or more confirmation times, wherein when the processor controls an output device to display verification results for three or more files or confirmation times, the processor controls the output device to display a verification result for an oldest file or confirmation time and a verification result for a latest file or confirmation time, and the processor controls the output device not to display a verification result for at least one file or confirmation time between the oldest file or confirmation time and the latest file or confirmation time until an operation performed by a user on an input device is received.

7. The data management apparatus according to claim 1, wherein when the processor controls the output device to display verification results for two or more files or confirmation times, the processor controls the output device to display the verification results for the confirmation times in a more emphasized manner than the verification results for the files.

8. A data management method comprising:

storing, in a distributed ledger by a processor in time series, one or more hash values and one or more time stamp tokens, the one or more hash values respectively being generated from one or more files, the one or more time stamp tokens proving one or more confirmation times; and performing, by the processor, based on a received user input a plurality of verification processes for the one or more files and the one or more confirmation times, the plurality of verification processes including first to third verification processes, wherein the first verification process is a process of verifying whether or not the one or more files used to generate the one or more hash values have been tampered with, the second verification process is a process of verifying whether or not the one or more confirmation times proven by the one or more time stamp tokens have been tampered with, and the third verification process is a process of verifying a sequence of the one or more files and the one or more confirmation times, wherein in response to receiving a first predetermined user operation from an input device, the processor performs the third verification process and does not perform the first verification process and the second verification process.

* * * * *